(12) United States Patent
Kawamura et al.

(10) Patent No.: US 10,326,892 B2
(45) Date of Patent: Jun. 18, 2019

(54) REMOTE SUPPORT SYSTEM AND RECORDING MEDIUM

(71) Applicant: Konica Minolta, Inc., Tokyo (JP)

(72) Inventors: Yuji Kawamura, Aichi (JP); Masayuki Ito, Aichi (JP); Takeshi Hibino, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/855,324

(22) Filed: Dec. 27, 2017

(65) Prior Publication Data

US 2018/0191917 A1 Jul. 5, 2018

(30) Foreign Application Priority Data

Jan. 5, 2017 (JP) .................................. 2017-000647

(51) Int. Cl.
*H04N 1/00* (2006.01)
(52) U.S. Cl.
CPC ..... *H04N 1/00129* (2013.01); *H04N 1/00411* (2013.01); *H04N 2201/0075* (2013.01); *H04N 2201/0094* (2013.01)
(58) Field of Classification Search
CPC ................................................. H04N 1/00129
USPC ........................................................ 358/1.15
See application file for complete search history.

(56) References Cited

U.S. PATENT DOCUMENTS

| 2004/0064762 A1* | 4/2004 | Deshpande | G06F 11/0733 714/44 |
| 2007/0198845 A1* | 8/2007 | Morikawa | G06F 3/121 713/182 |
| 2012/0317549 A1* | 12/2012 | Cunningham | G06F 11/3612 717/128 |
| 2013/0179808 A1* | 7/2013 | Kano | G06F 3/01 715/760 |
| 2013/0298032 A1* | 11/2013 | Sugaya | H04L 69/24 715/736 |

FOREIGN PATENT DOCUMENTS

JP         2015-170049 A      9/2015

* cited by examiner

*Primary Examiner* — Jacky X Zheng
(74) *Attorney, Agent, or Firm* — Osha Liang LLP

(57) ABSTRACT

A remote support system includes: an image processing apparatus; an information terminal apparatus; and an information processing apparatus serving for remote support. The image processing apparatus and the information terminal apparatus operate in sync with each other. Either or both of the image processing apparatus and the information terminal apparatus execute the following operations: receiving a synchronous display start command; determining whether or not the image processing apparatus and the information terminal apparatus are operating in sync with each other; obtaining first screen information on the image processing apparatus and second screen information on the information terminal apparatus if the image processing apparatus and the information terminal apparatus are operating in sync with each other; and transmitting the first and second screen information to the information processing apparatus. The information processing apparatus reproduces screens on the basis of the first and second screen information received therefrom.

19 Claims, 20 Drawing Sheets

REMOTE SUPPORT SYSTEM AND RECORDING MEDIUM

CROSS-REFERENCE TO RELATED APPLICATIONS

The disclosure of Japanese Patent Application No. 2017-000647 filed on Jan. 5, 2017, including description, claims, drawings, and abstract, is incorporated herein by reference in its entirety.

BACKGROUND

Technical Field

The present invention relates to: an image processing apparatus such as a multi-function peripheral (MFP) i.e. a multifunctional digital machine; a remote support system provided with an information terminal apparatus such as a smartphone or tablet computer capable of operating in sync with the image processing apparatus; an information processing apparatus for remote support; and a recording medium.

Description of the Related Art

Various systems that enable remote support on an image processing apparatus have been heretofore suggested. For example, in such a system, an information processing apparatus for remote support displays a screen identical with the current screen of an image processing apparatus in a synchronous manner. The information processing apparatus transmits coordinate data indicating a touch event on the screen to the image processing apparatus, and the image processing apparatus produces another screen with reference to the received coordinate data and displays the screen. The user who is unfamiliar with how to manipulate the image processing apparatus is thus allowed to receive support from the information processing apparatus.

According to Japanese Unexamined Patent Application Publication No. 2015-170049, such a heretofore known system is disclosed as an image forming system that includes an information processing apparatus for supporting an image forming apparatus. This image forming system includes an information processing apparatus for user support, an image forming apparatus, and an information terminal apparatus, which are connected to each other through a network. The information processing apparatus is provided with: a screen emulator that produces a screen image for screen sharing; a screen sharing portion that shares the screen image; and an access switch that switches the support target to the information terminal apparatus upon request from the image forming apparatus. The information processing apparatus is thus allowed to switch the support target to the information terminal apparatus upon request from the image forming apparatus.

Recently introduced functions allow an image processing apparatus such as an MFP as described above and an information terminal apparatus to operate in sync with each other. To input data to the image processing apparatus using KEYBOARD LINK and/or ADDRESS LINK function, for example, the user has to manipulate both the image processing apparatus and the information terminal apparatus. However, the user may be unfamiliar with how to manipulate an operation screen displayed on the information terminal apparatus; the user may be even more unfamiliar with how to manipulate an operation screen on the image processing apparatus and an operation screen on the information terminal apparatus alternately.

It can be considered that the information processing apparatus for remote support displays a screen identical with the current screen of the image processing apparatus in a synchronous manner. In this case, the operator of the information processing apparatus is allowed to provide manipulation support on the information processing apparatus with a screen displayed in a synchronous manner, but allowed to provide manipulation support on the information terminal apparatus only by telephone or the like with no such screen. Without a screen displayed on the information terminal apparatus in a synchronous manner, it will not be easy for the operator to grasp the situation by telephonic communication.

As described above, while the image processing apparatus and the information terminal apparatus are operating in sync with each other, the user cannot receive accurate and efficient support because the information processing apparatus for remote support is not capable of displaying the current screen of the information terminal apparatus all that while.

According to the system of Japanese Unexamined Patent Application Publication No. 2015-170049, the image processing apparatus is capable of displaying a screen produced by the information processing apparatus but the information processing apparatus is not capable of displaying the current screen of the information terminal apparatus. So, this system cannot provide accurate and efficient support while the image processing apparatus and the information terminal apparatus are operating in sync with each other.

SUMMARY

The present invention, which has been made in consideration of such a technical background as described above, is capable of allowing the user to receive accurate and efficient support remotely even while an image processing apparatus and an information terminal apparatus are operating in sync with each other.

One or more embodiments of the present invention relates to a remote support system including:
an image processing apparatus;
an information terminal apparatus; and
an information processing apparatus,
the image processing apparatus, the information terminal apparatus and the information processing apparatus being capable of communicating with each other, the information processing apparatus serving for remote support,
the image processing apparatus including:
a first hardware processor that allows operating in sync with the information terminal apparatus; and
a first display,
the information terminal apparatus including:
a second hardware processor that allows operating in sync with the image processing apparatus; and
a second display,
either or both of the first hardware processor of the image processing apparatus and the second hardware processor of the information terminal apparatus perform the following operations:
receiving a synchronous display start command;
judging whether or not the image processing apparatus and the information terminal apparatus are operating in sync with each other;
obtaining both first and second screen information, the first screen information being on a first screen displayed on the first display, the second screen information being on a second screen displayed on the second display, if the image processing apparatus and the information terminal apparatus are operating in sync with each other; and transmitting the first and second screen information to the information processing apparatus, the information processing apparatus including:

a third display; and a third hardware processor that reproduces the first screen of the image processing apparatus and the second screen of the information terminal apparatus on the third display on the basis of the first and second screen information received from either the image processing apparatus or the information terminal apparatus.

One or more embodiments of the present invention relates to a remote support system including:

an image processing apparatus;

an information terminal apparatus; and an information processing apparatus, the image processing apparatus and the information terminal apparatus being capable of communicating with each other, the information processing apparatus serving for remote support, the image processing apparatus including:

a first hardware processor that allows operating in sync with the information terminal apparatus; and a first display, the information terminal apparatus including:

a second hardware processor that allows operating in sync with the information terminal apparatus; and a second display, either or both of the first hardware processor of the image processing apparatus and the second hardware processor of the information terminal apparatus perform the following operations:

receiving s a synchronous display start command;

judging whether or not the image processing apparatus and the information terminal apparatus are operating in sync with each other;

internally obtaining either first or second screen information, the first screen information being on a first screen displayed on the first display, the second screen information being on a second screen displayed on the second display, if the image processing apparatus and the information terminal apparatus are operating in sync with each other;

transmitting the first or second screen information to the information processing apparatus, requesting the image processing apparatus or the information terminal apparatus to transmit its own screen information to the information processing apparatus, the own screen information being either the first or second screen information not being obtained, the image processing apparatus or the information terminal apparatus obtains its own screen information as requested and transmits it to the information processing apparatus, the own screen information being either the first or second screen information not being obtained, the information processing apparatus including:

a third display; and a third hardware processor that reproduces the first screen of the image processing apparatus and the second screen of the information terminal apparatus on the third display on the basis of the first and second screen information received separately from the image processing apparatus and the information terminal apparatus.

One or more embodiments of the present invention relates to a non-transitory computer-readable recording medium storing remote support programs for an image processing apparatus including:

an interface that communicates with an information terminal apparatus and an information processing apparatus, the information processing apparatus serving for remote support; and a first display, the programs causing the image processing apparatus to execute:

allowing operating in sync with the information terminal apparatus;

receiving a synchronous display start command;

judging whether or not the image processing apparatus and the information terminal apparatus are operating in sync with each other;

obtaining both first and second screen information, the first screen information being on a first screen displayed on the first display, the second screen information being on a second screen displayed on a second display of the information terminal apparatus, if the image processing apparatus and the information terminal apparatus are operating in sync with each other; and transmitting the first and second screen information to the information processing apparatus.

One or more embodiments of the present invention relates to a non-transitory computer-readable recording medium storing programs for an image processing apparatus including:

an interface that communicates with an information terminal apparatus and an information processing apparatus, the information processing apparatus serving for remote support; and a first display, the programs causing the image processing apparatus to execute:

allowing operating in sync with the information terminal apparatus;

receiving a synchronous display start command;

judging whether or not the image processing apparatus and the information terminal apparatus are operating in sync with each other;

obtaining first screen information on a first screen displayed on the first display, if the image processing apparatus and the information terminal apparatus are operating in sync with each other;

transmitting the first screen information to the information processing apparatus; and requesting the information terminal apparatus to transmit second screen information to the information processing apparatus, the second screen information being on a second screen displayed on a second display of the information terminal apparatus, if the image processing apparatus and the information terminal apparatus are operating in sync with each other.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
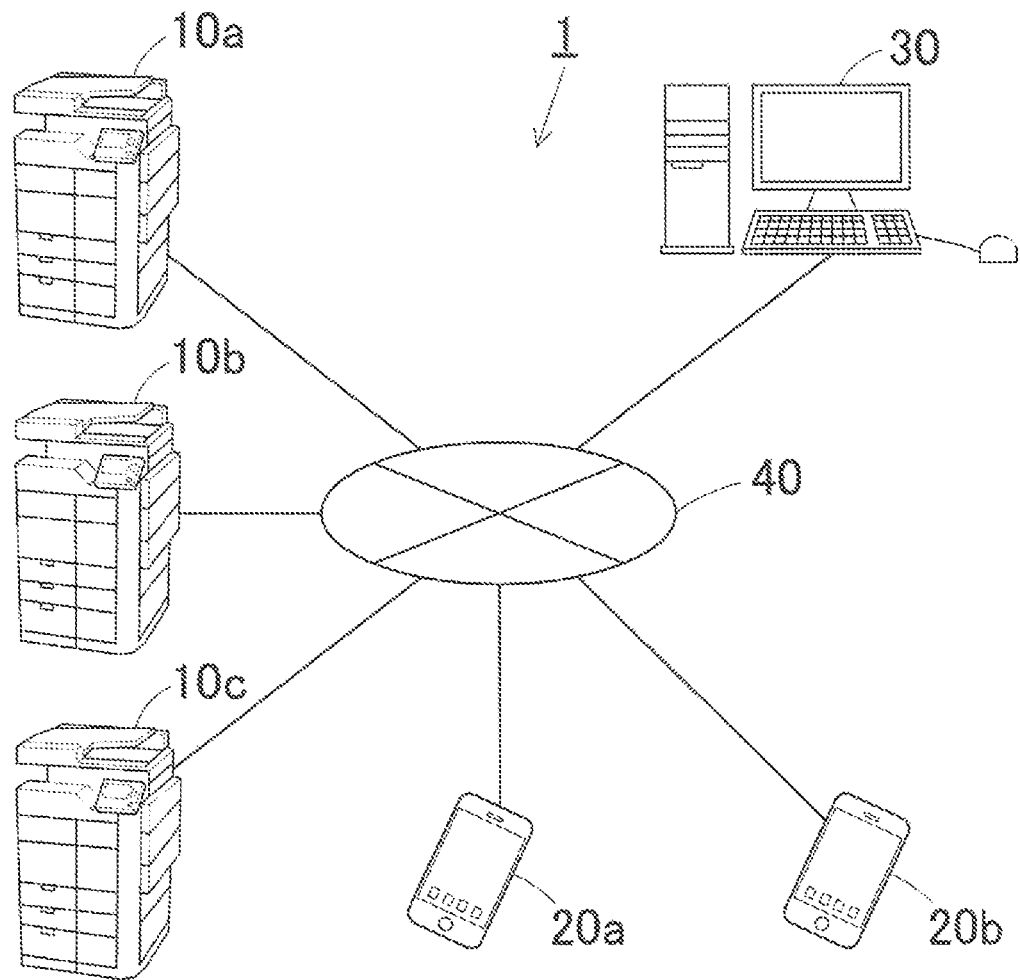
FIG. 1 illustrates a configuration of a remote support system according to one or more embodiments of the present invention.

FIG. 1 illustrates a configuration of a remote support system 1 according to one or more embodiments of the present invention.

This remote support system 1 is essentially provided with multiple (three, in one or more embodiments) image processing apparatuses i.e. image processing apparatuses 10a, 10b, and 10c, multiple (two, in one or more embodiments) information terminal apparatuses i.e. information terminal apparatuses 20a and 20b, and an information processing apparatus 30. The image processing apparatuses 10a, 10b, and 10c, the information terminal apparatuses 20a and 20b, and the information processing apparatus 30 are connected to each other through a network 40.

In one or more embodiments, MFPs, each having various functions such as copier function, printer function, scanner function, and facsimile function as described above, are employed as the image processing apparatuses 10a, 10b, and 10c.

Hereinafter, the image processing apparatuses 10a, 10b, and 10c each will be referred to simply as the image processing apparatus 10 when there is no need to identify these one by one. The image processing apparatuses also will be referred to as the MFPs.

Similarly, the information terminal apparatuses 20a and 20b each will be referred to simply as the information terminal apparatus 20 when there is no need to identify these one by one. The information terminal apparatuses also will be referred to as the information terminals.

The MFP 10 is an apparatus that forms a scanned document image on a sheet of paper and reproduces an image on a sheet of paper on the basis of print data received from user terminals including the information terminals 20. In the information terminal apparatus 20, an operating system or an application program issues a draw command and a printer driver converts it to a page description language supported on the MFP 10; and the print data is such a draw command described in a page description language supported on the MFP 10. Alternatively, the print data is a document file described in PDF, TIFF, JPEG, XPS, or another file format.

The MFP 10 is capable of transferring a scanned document image to user terminals and the other MFPs 10 through the network 4. Similarly, the MFP 10 is capable of transferring a scanned document image to other MFPs 10 on another network beyond the network 4. The MFP 10 is also capable of accumulating scanned document images and document files received from user terminals, on a fixed storage.

Figure 2:
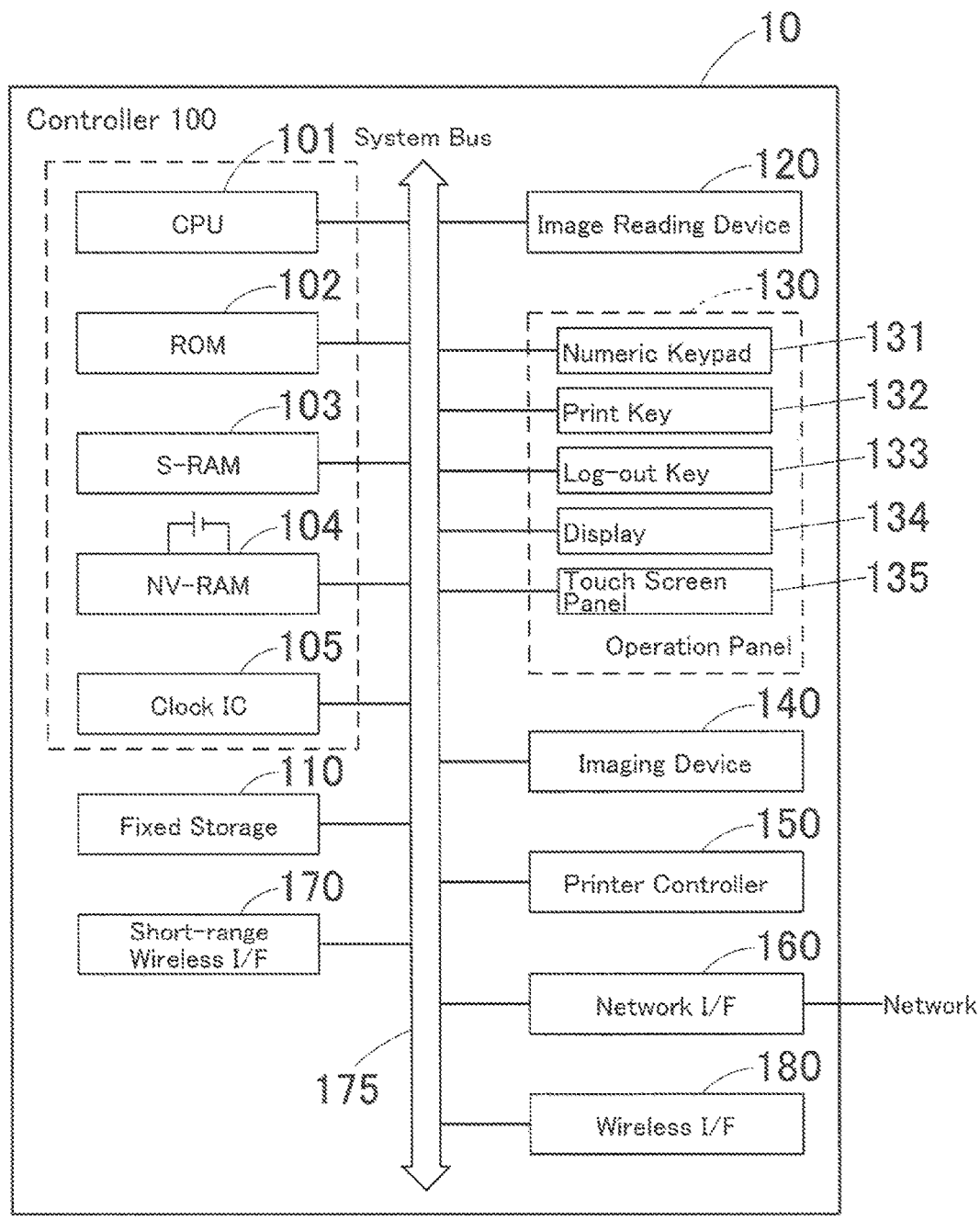
FIG. 2 is a block diagram illustrating an electrical configuration of an image processing apparatus according to one or more embodiments.

FIG. 2 is a block diagram illustrating an electrical configuration of the MFP 10. As illustrated in FIG. 2, the MFP 10 is provided with a controller 100, a fixed storage 110, an image reading device 120, an operation panel 130, an imaging device 140, a printer controller 150, a network interface (network I/F) 160, a short-range wireless interface (short-range wireless I/F) 170, and a wireless interface (wireless I/F) 180; these are connected to each other through a system bus 175.

The controller 100 is essentially provided with a CPU 101, a ROM 102, a static random access memory (S-RAM) 103, a NV-RAM 104, and a clock IC 105.

The CPU 101 controls the MFP 10 in a unified and systematic manner by executing programs stored on a recording medium such as the ROM 102. In one or more embodiments, the CPU 101 serves as a synchronizer that allows operating in sync with the information terminal 20 in a synchronous mode, which enables manipulation on the MFP 10 from the information terminal 20. The CPU 101 further serves as a transmitter-receiver that exchanges data with the information terminal 20 via the network interface 160. The CPU 101 still further serves as a receiver that receives a synchronous display start command and as a judgment portion that judges (determines) whether or not the MFP 10 is operating in sync with the information terminal 20. Furthermore, if the CPU 101, as a judgment portion, judges that the MFP 10 is operating in sync with the information terminal 20, the CPU 101 serves as a screen information obtaining portion that obtains first screen information on a first screen that is displayed on the display 134 of the operation panel 130 and second screen information on a second screen that is displayed on a display 220 (shown in FIG. 3) of the information terminal 20. These functions, other functions, and operations of the CPU 101 will be later described in detail.

The ROM 102 essentially stores programs to be executed by the CPU 101.

The S-RAM 103 serves as a workspace for the CPU 101 to execute programs, and essentially stores the programs and data to be used by the programs for a short time.

The NV-RAM 104 is a battery backed-up non-volatile memory, and essentially stores various settings related to image forming.

The clock IC 105 serves as an internal timer, and essentially measures processing times.

The fixed storage 110 is comprised of a hard disk drive, for example, and essentially stores programs and data of various types.

The image reading device 120 is essentially provided with a scanner. The image reading device 120 obtains a document image by scanning a document set on a platen and converts the document image into an image file format.

The operation panel 130 allows the user to give instructions for various jobs to the MFP 10 and to configure various settings. The operation panel 130 is essentially provided with a numeric keypad 131, a print key 132, a log-out key 133, a display 134 as a first display, and a touch screen panel 135.

The numeric keypad 131 allows the user to configure various settings; the print key 132 allows the user to give instructions for print jobs; the log-out key 133 allows the user to log out of the MFP 10 when he/she finishes using it.

The operation panel 134 is comprised of a liquid-crystal screen, for example, and displays messages and various operation screens, and other information.

The touch screen panel 135 is a touch screen layer disposed on the display 134, and detects user interactions i.e. touch events.

The imaging device 140 forms an obtained copy of an image on a sheet of paper.

The printer controller 150 crates a copy of an image on the basis of print data received by the network interface 160.

The network interface (network I/F) 160 serves as a communicator that transmits and receives data to and from external apparatuses such as the information terminals 20 and the information processing apparatus 30 under the command of the CPU 101.

The short-range wireless interface 170 essentially serves for short-range wireless communications with the information terminals 20; the wireless interface (wireless I/F) 180 serves for wireless communications with the network 40 or the information terminals 20.

Meanwhile, the information terminal 20 is a portable computer such as a smartphone, a tablet computer, and an electronic paper display. The information terminal 20 accumulates electronic documents inside, allowing the user to carry the electronic documents with him/her and view and edit them anywhere. The information terminal 20 has a wireless communication member to exchange documents with the MFPs 10 and user terminals. The information terminal 20 also has a member that allows the user to manipulate the MFP 10 remotely.

Figure 3:
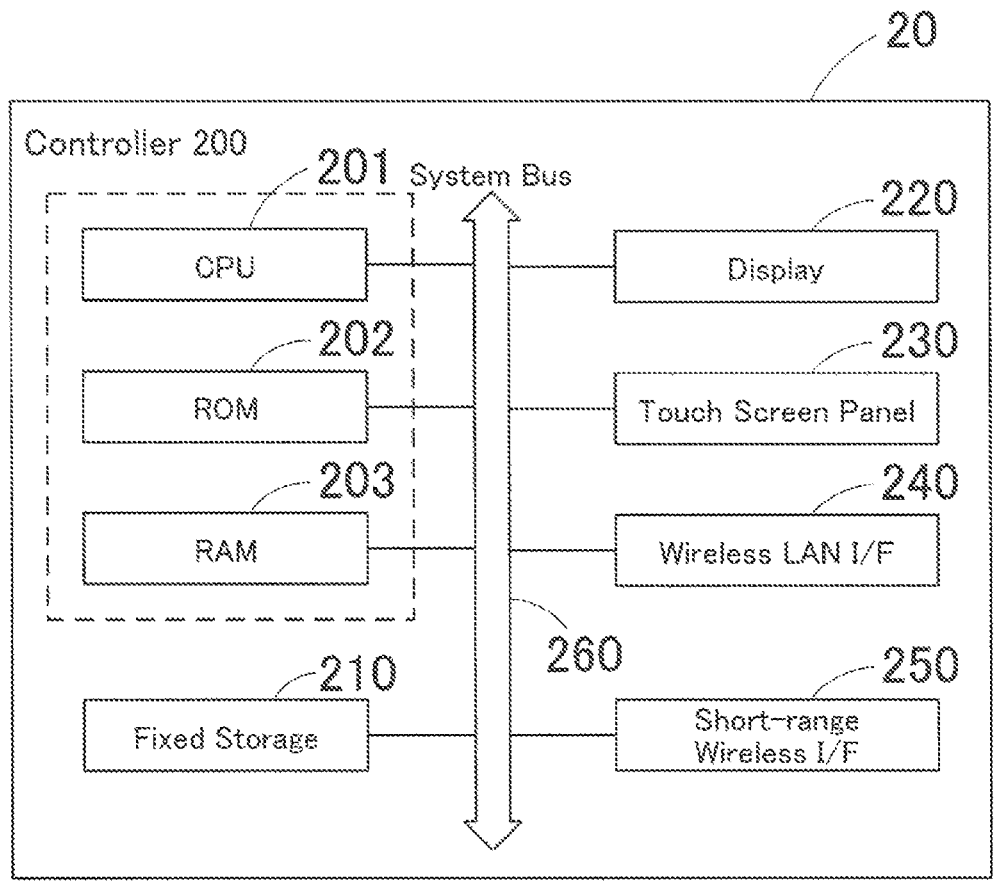
FIG. 3 is a block diagram illustrating an electrical configuration of an information terminal apparatus according to one or more embodiments.

FIG. 3 is a block diagram illustrating an electrical configuration of the information terminal 20.

The information terminal 20 is provided with a controller 200, a fixed storage 210, a display 220 as a second display, a touch screen panel 230, a wireless LAN interface (wireless LAN I/F) 240, and a short-range wireless interface (short-range wireless I/F) 250; these are connected to each other through a system bus 260.

The controller 200 is essentially provided with a CPU 201, a ROM 202, and a RAM 203.

The CPU 201 controls the information terminal 20 in a unified and systematic manner by executing programs stored on a recording medium such as the ROM 202. In one or more embodiments, the CPU 201 serves as a synchronizer that allows operating in sync with the MFP 10 in a synchronous mode, which enables manipulation on the MFP 10 from the information terminal 20. The CPU 201 further serves as a transmitter-receiver that exchanges data and commands for data processing with the MFP 10 via the wireless LAN interface 240. The CPU 201 still further serves as a receiver that receives a synchronous display start command and as a judgment portion that judges (determines) whether or not the information terminal 20 is operating in sync with the MFP 10. Furthermore, if the CPU 201, as a judgment portion, judges that the information terminal 20 is operating in sync with the MFP 10, the CPU 201 serves as a screen information obtaining portion that obtains first screen information on a first screen that is displayed on the display 134 of the operation panel 130 and second screen information on a second screen that is displayed on the display 220 of the information terminal 20.

The ROM 202 essentially stores programs to be executed by the CPU 201.

The RAM 203 serves as a workspace for the CPU 201 to execute programs, and essentially stores the programs and data to be used by the programs for a short time.

The fixed storage 210 is comprised of a hard disk drive, for example, and essentially stores programs and data of various types.

The operation panel 220 is comprised of a liquid-crystal screen, for example, and essentially displays messages and various operation screens including screens for manipulating the MFP 10.

The touch screen panel 230 is a touch screen layer disposed on the display 220, and detects user interactions i.e. touch events.

The wireless LAN interface 240 serves for wireless communications beyond the network 40; the short-range wireless interface 250 essentially serves for short-range wireless communications with the MFP 10.

As described above, the information terminal 20 is capable of accessing the MFP 10 wirelessly (the user is allowed to manipulate the MFP 10 remotely from the information terminal 20) in the synchronous mode.

The information processing apparatus 30 is a server that enables remote support, and is comprised of a personal computer.

Figure 4:
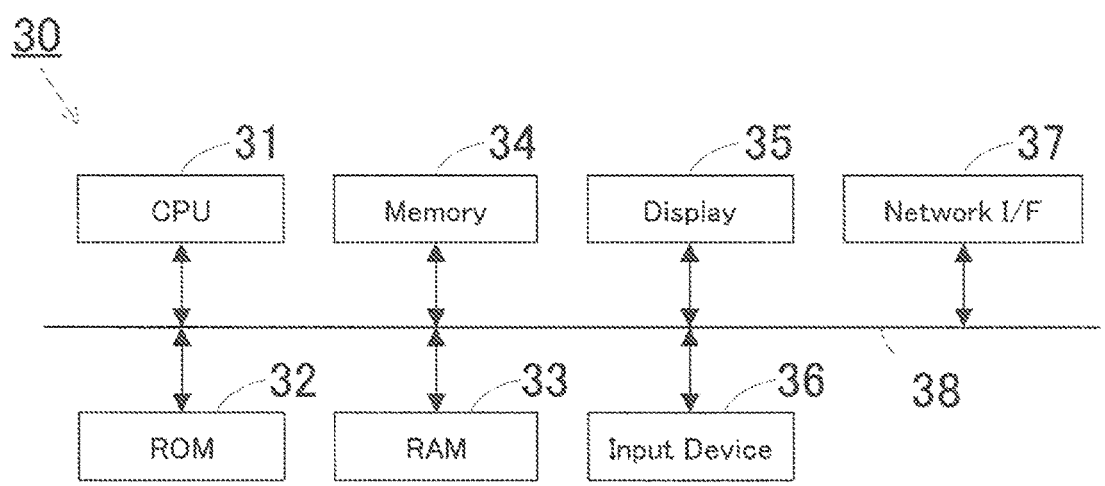
FIG. 4 is a block diagram illustrating an electrical configuration of an information processing apparatus according to one or more embodiments.

FIG. 4 is a block diagram illustrating an electrical configuration of the information processing apparatus 30.

As illustrated in FIG. 4, the information processing apparatus 30 is essentially provided with a CPU 31, a ROM 32, a RAM 33, a memory 34, a display 35 as a third display, an input device 36, and a network interface (network I/F) 37; these are connected to each other through a system bus 38.

The CPU 31 controls the information processing apparatus 30 in a unified and systematic manner by executing programs stored on a recording medium such as the ROM 32 or the memory 34. For example, in one or more embodiments, the CPU 31 serves as a display processor that performs the following processes while a remote support mode is on: reproducing the current screen on the display 134 of the MFP 10 and the current screen on the display 220 of the information terminal 20 on the basis of the screen information received from the MFP 10 or the information terminal 20; displaying the reproduced screens on the display 35; producing screen data addressed to the MFP 10 and screen data addressed to the information terminal 20; and transmitting the screen data to the MFP 10 and the information terminal 20. These processes will be later described in detail.

The ROM 32 is a recording medium that essentially stores programs to be executed by the CPU 31.

The RAM 33 is a recording medium that provides a workspace for the CPU 31 to perform processing in accordance with operation programs.

The memory 34 is a recording medium comprised of a hard disk drive, for example, and essentially stores management data of various types and application programs.

The display 35 is comprised of a CRT or liquid-crystal display, and essentially displays various messages, input screens, and selection screens for the user.

The input device 36 serves for user input, and is essentially comprised of a keyboard and a mouse.

The network interface 37 serves as a communicator that transmits and receives data to and from external apparatuses such as the MFPs 10 and the information terminals 20 through the network 40.

Figure 5:
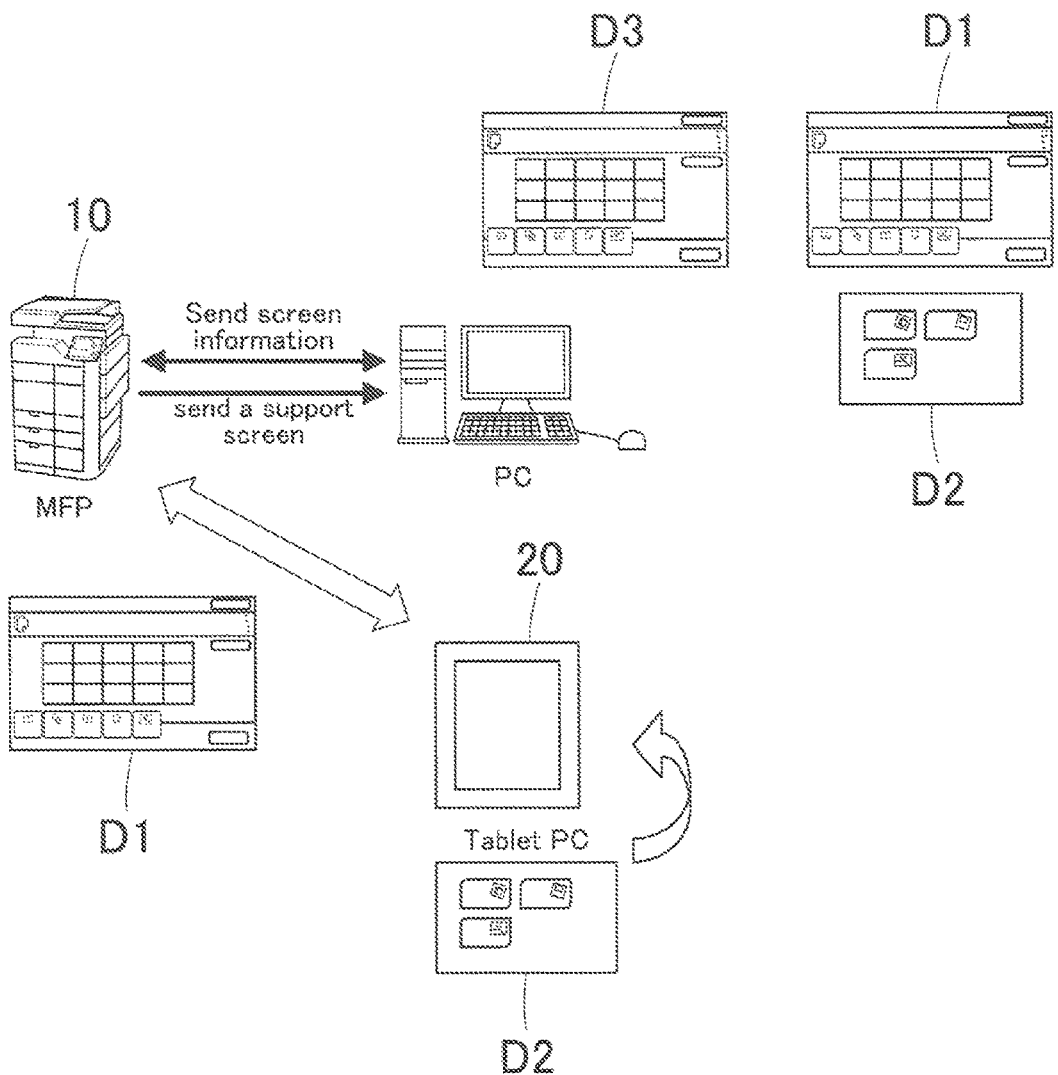
FIG. 5 is a view for reference in describing a procedure to be followed by the remote support system according to one or more embodiments.

FIG. 5 is a view for reference in describing a procedure to be followed by the remote support system 1 shown in FIG. 1.

As described above, the MFPs 10, the information terminals 20, and the information processing apparatus 30 are connected to each other through the network 40. The information processing apparatus 30 has a Web server and a built-in remote access application for remote access to the MFPs 10. The user of the MFP 10 can receive support remotely from the information processing apparatus 30 and also can communicate with the operator in the support service center by telephone, facsimile, WebDAV, e-mail, or any other protocol.

The MFP 10 is capable of transmitting the first screen information on a first screen D1 displayed on the display 134 to the information processing apparatus 30 via the Web server by accessing the Web server periodically. The information processing apparatus 30 is capable of transmitting screen data of an operation screen D3 to the MFP 10 via the Web server. Specifically, the screen data transmitted by the information processing apparatus 30 is coordinates on the operation screen D3 of the MFP 10. MFP 10 is capable of analyzing the coordinates received therefrom and displaying the operation screen D3 on the display 134. The operation screen D3 is the next screen to be displayed upon a touch event at the coordinates.

The MFP 10 is further capable of obtaining the second screen information on a second screen D2 displayed on the display 220 of the information terminal 20 by requesting the information terminal 20 to return the second screen information. The information terminal 20 is capable of transmitting the second screen information to the MFP 10 upon request. The MFP 10 is still further capable of transmitting the first screen information of the MFP 10 itself and the second screen information together to the information processing apparatus 30 via the Web server. The information processing apparatus 30 is capable of reproducing the first screen D1 of the MFP 10 and the second screen D2 of the information terminal 20 together on the display 35 on the basis of the first and second screen information received therefrom.

The information terminal 20 has a built-in synchronous application for operating in sync with the MFP 10. Similarly, the MFP 10 has a built-in synchronous application for operating in sync with the information terminal 20. While the information terminal 20 is operating in sync with the MFP 10 by this application, the information terminal 20 is capable of performing one process through the network 40, for example: obtaining data from a box i.e. a memory area in the fixed storage 110 or transferring an input text to the MFP 10.

While the MFP 10 and the information terminal 20 are operating in sync with each other by their synchronous applications, the user can perform a job as described below, for example.

The user may need to input a long text to the MFP 10 but feel bothered to manipulate the operation panel 130 of the MFP 10 because he/she is unfamiliar with how to do it. In this case, the user can input a text to the MFP 10 from the information terminal 20 using KEYBOARD LINK function. Specifically, the user starts KEYBOARD LINK mode via the top screen of the information terminal 20, inputs a text in the text input field using the input method editor (IME), and further inputs the IP address of the MFP 10. Subsequently, the user goes to a text input screen on the display 134 of the MFP 10, and presses a "Send" key on the screen displayed on the information terminal 20.

Similarly, the user may need to input an e-mail address to the MFP 10 but may feel bothered to manipulate the MFP 10. In this case, the user can do it from the information terminal 20 using ADDRESS LINK function. Specifically, the user starts ADDRESS LINK mode via the top screen of the information terminal 20, selects an e-mail address, and inputs the IP address of the MFP 10. Subsequently, the user goes to an address input screen on the display 134 of the MFP 10, and presses a "Send" key on the screen displayed on the information terminal 20.

As described above, it is already troublesome to take every step using KEYBOARD LINK or ADDRESS LINK function and manipulate both the MFP 10 and the information terminal 20 alternately. If the user is unfamiliar with how to manipulate the MFP 10 and the information terminal 20 in the synchronous mode, it would be even more difficult for him/her to follow a user manual or an online documentation or to explain the situation to the operator accurately over the telephone, which causes a failure in effective use of the synchronous function of the MFP 10 and the information terminal 20.

While the MFP 10 and the information terminal 20 are operating in sync with each other by their synchronous applications, the user can issue a direct print job to the MFP 10 from the information terminal 20, for another example. However, the user may be unaware of a possible mismatch in paper size setting between the MFP 10 and the information terminal 20 and fail to specify a paper tray from the operation panel 130 of the MFP 10. In this case, the user will be unable to obtain print.

While the MFP 10 and the information terminal 20 are operating in sync with each other by their synchronous applications, the user can send a scan-to-box job to the MFP 10 from the information terminal 20, for yet another example.

However, the user may lose the connectivity to the network 40. In this case, the user needs to connect the information terminal 20 to the wireless unit of the MFP 10 by manipulating the operation panel 130 of the MFP 10 in a direct manner. Specifically, the user needs to make the MFP 10 to display a QR code indicating the wireless setting of the MFP 10 and make the information terminal 20 read the QR code, for example. Although, it is absolutely possible that the user is unfamiliar with how to do it because he/she rarely uses QR codes.

When some troubles arise in manipulating the MFP 10 from the information terminal 20 as described above, the user can receive support remotely from the information processing apparatus 30.

The remote support mode is started when the MFP 10 receives a synchronous display start command from the information processing apparatus 30. The synchronous display start command is a command for displaying the current screen on the display 134 of the MFP 10 and the current screen on the display 220 of the information terminal 20 on the display 35 of the information processing apparatus 30 in a synchronous manner. The remote support mode is started when the MFP 10 receives a signal as a synchronous display start command from the information processing apparatus 30 or when the user presses a support mode button on a screen displayed on the display 134 of the MFP 10.

Figure 6:
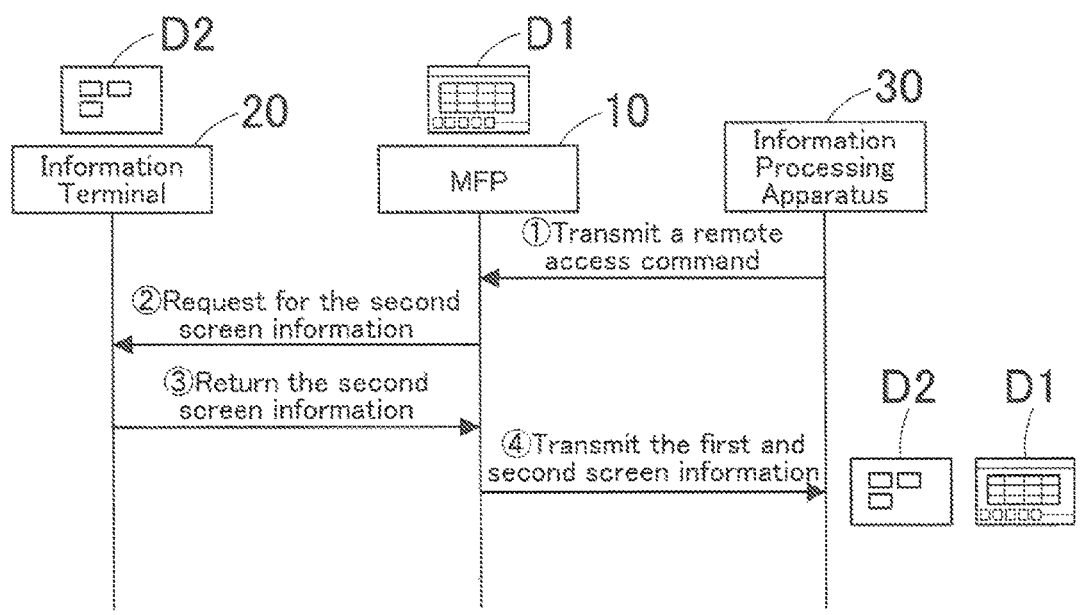
FIG. 6 is a view for reference in describing a procedure to be followed by the remote support system when the image processing apparatus receives a synchronous display start command from the information processing apparatus according to one or more embodiments.

FIG. 6 is a view for reference in describing a procedure to be followed by the remote support system 1 when the MFP 10 receives a synchronous display start command from the information processing apparatus 30.

The MFP 10 receives a synchronous display start command (to be also referred to as a remote access command) from the information processing apparatus 30, for example (circled number 1 in FIG. 6). The MFP 10 then requests the information terminal 20 to return the second screen information on a second screen D2 displayed on the display 220 (circled number 2 in FIG. 6). The MFP 10 receives the second screen information from the information terminal 20 (circled number 3 in FIG. 6). The MFP 10 then transmits, to the information processing apparatus 30, the first screen information on a first screen D1 displayed on the display 134 of the MFP 10 itself and the second screen information received from the information terminal 20 (circled number 4 in FIG. 6).

The MFP 10 may transmit the first and second screen information to the information processing apparatus 30 in an HTTP session. Alternatively, the MFP 10 may have a WebDAV or FTP server such that the information processing apparatus 30 accesses the server periodically.

The first and second screen information will be received by the information processing apparatus 30. As instructed by the CPU 31, the first screen D1 of the MFP 10 and the second screen D2 of the information terminal 20 will be reproduced on the display 35 on the basis of the first and second screen information.

The first and second screen information may be image information (bitmap image) of the first screen D1 of the MFP 10 and the second screen D2 of the information terminal 20. In this case, the image information of the second screen D2 of the information terminal 20 is a screen captured by the information terminal 20. If the information terminal 20 is based on a platform for ANDROID, the information terminal 20 performs screen capture using an API such as a media projection API; if the information terminal 20 is based on a platform for IOS, the information terminal 20 performs screen capture using the API code "renderInContext:UIGraphicsGetCurrentContext", for example. The image information of the first screen D1 of the MFP 10 may be a captured screen; alternatively, it may be composed of a background image, object images, and layout information of the foregoing images.

The information processing apparatus 30 may store various screens of the MFP 10 and various screens of the information terminal 20 along with identification information objects given to the screens. In this case, the first and second screen information may be the identification information objects of the screens D1 and D2. In this case, the information processing apparatus 30 must have a correspondence table containing records of screen images and identification information objects given to the screen images, and is thus allowed to search the table by identification information objects, identify screen images, and display the screen images, when receiving the identification information objects as the first and second screen information.

The information processing apparatus 30 now displays the first screen D1 and the second screen D2 that are the current screen of the MFP 10 and the current screen of the information terminal 20. This proves that the MFP 10 displays a screen of the information terminal 20 successfully in a synchronous manner and the information processing apparatus 30 displays screens of the MFP 10 and the information terminal 20 successfully in a synchronous manner. With the first screen D1 of the MFP 10 and the second screen D2 of the information terminal 20 together, the operator of the information processing apparatus 30 can grasp the user's situation from the information processing apparatus 30 even while the MFP 10 and the information terminal 20 are operating in sync with each other.

For example, the user, who is unfamiliar with how to input a text to the MFP 10 from the information terminal 20 using KEYBOARD LINK function, can call the support service center of the remote support system 1 or can press a "KeyboardLink Help" button on the operation panel 130 of the MFP 10 or on the current screen of the information terminal 20 while the synchronous applications are active. In response to the user's action, the information processing apparatus 30 activates a remote access application to transmit a remote access command (synchronous display start command) to the MFP 10. After that, by following the steps with circled numbers 1 to 4 in FIG. 6, the information processing apparatus 30 displays a screen D1 currently displayed on the MFP 10 and a screen D2 currently displayed on the information terminal 20, on the display 35. So, the operator of the information processing apparatus 30 will be able to find the user's situation and the exact step where the user is stuck. By contrast, in the heretofore known technology, the information processing apparatus 30 displays only a screen D1 of the MFP 10; so, the operator of the information processing apparatus 30 cannot determine the exact step where the user is stuck or give accurate instructions on how to manipulate the MFP 10 and the information terminal 20.

Figure 7:
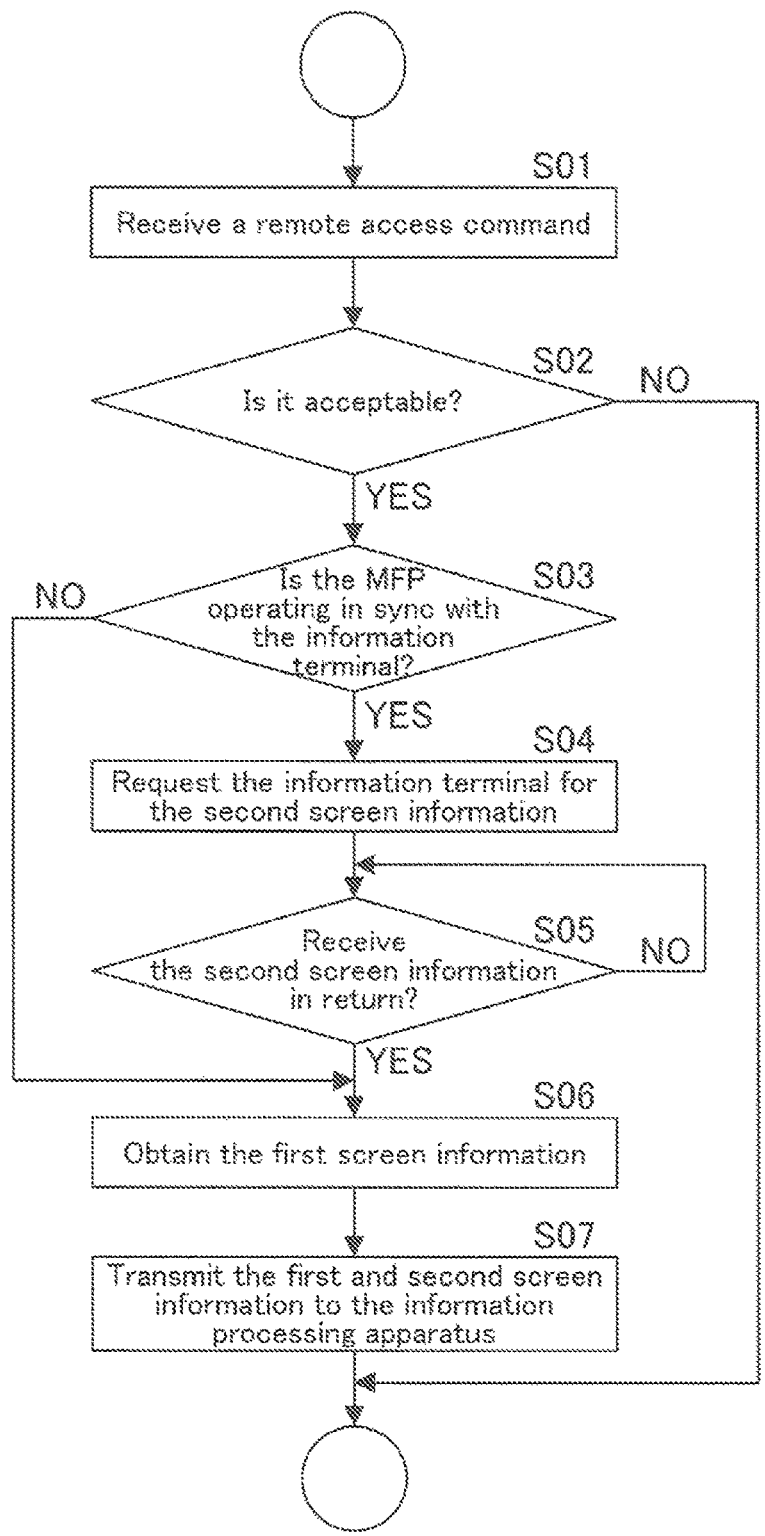
FIG. 7 is a flowchart representing an operation to be performed by the image processing apparatus when the image processing apparatus receives a synchronous display start command (remote access command) according to one or more embodiments.

FIG. 7 is a flowchart representing an operation to be performed by the MFP 10 when the MFP 10 receives a synchronous display start command (remote access command). The operations represented by the FIG. 7 flowchart and the following flowcharts are performed by the CPU 101 of the MFP 10 as instructed by operation programs stored on a recording medium such as the ROM 102.

In Step S01, a remote access command is received from the information processing apparatus 30; in Step S02, it is judged whether a remote access command is acceptable. If it is not acceptable (NO in Step S02), the routine terminates. If it is acceptable (YES in Step S02), then it is judged in Step S03 whether or not the MFP 10 is operating in sync with the information terminal 20.

The fact whether or not the MFP 10 is operating in sync with the information terminal 20 can be examined by polling, for example. Specifically, if the MFP 10 receives either a polling command or a response to a polling command within a certain period from the information terminal 20, it is judged that the MFP 10 is operating in sync with the information terminal 20. The fact also can be examined depending on the value written in the data exchanged by polling.

In Step S03, if it is operating in sync with the information terminal 20 (YES in Step S03), the information terminal 20 is requested to return the second screen information in Step S04. It is then judged in Step S05 whether or not the second screen information is received from the information terminal 20 in return.

If it is not received (NO in Step S05), the routine waits in Step S05 until it is received. If it is received (YES in Step S05), the routine proceeds to Step S06. Back to Step S03, if the MFP 10 is not operating in sync with the information terminal 20 (NO in Step S03), the routine proceeds directly to Step S06.

In Step S06, the first screen information on the screen D1 of the MFP 10 is obtained; in Step S07, the first and second screen information is transmitted to the information processing apparatus 30. If the MFP 10 is not operating in sync with the information terminal 20, only the first screen information is transmitted in this step.

The information processing apparatus 30 will receive the first and second screen information. The information processing apparatus 30 will then reproduce the first screen D1 of the MFP 10 and the second screen D2 of the information terminal 20 together on the display 35 on the basis of the first and second screen information. If the MFP 10 is not operating in sync with the information terminal 20, the information processing apparatus 30 will display only the first screen D1.

In one or more embodiments referred to in FIGS. 6 and 7, the procedure from the step of requesting for the second screen information (circled number 2 in FIG. 6; Step S04 in FIG. 7) to the step of transmitting the first and second screen information to the information processing apparatus 30 (circled number 4 in FIG. 6; Step S07 in FIG. 7) is repeated periodically. The information processing apparatus 30 is thus allowed to update the first screen D1 and the second screen D2 automatically.

Figure 8:
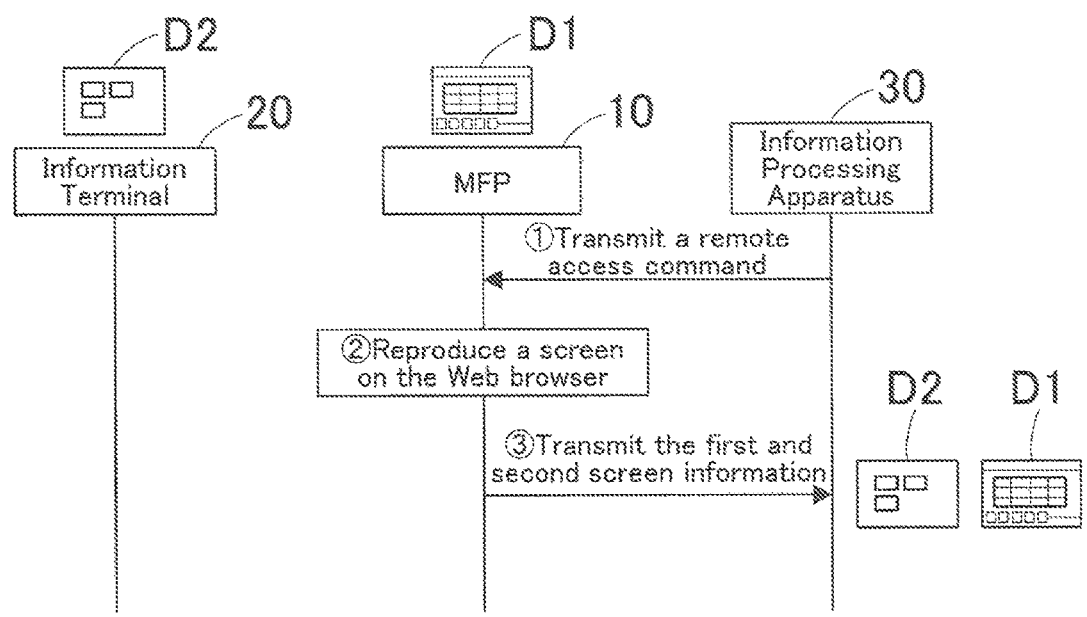
FIG. 8 is a view for reference in describing another procedure to be followed by the remote support system when the image processing apparatus receives a synchronous display start command from the information processing apparatus according to one or more embodiments.

FIG. 8 is a view for reference in describing another operation to be followed by the remote support system 1 when the MFP 10 receives a synchronous display start command from the information processing apparatus 30.

In this example, the MFP 10 has an internal Web server and a client function, and the information terminal 20 accesses the Web server of the MFP 10 as a client. The information terminal 20 displays a second screen D2 via the Web server. The MFP 10 further stores identification information objects associated with various second screens D2 to be displayed on the information terminal 20.

As illustrated in FIG. 8, the MFP 10 receives a synchronous display start command (remote access command) from the information processing apparatus 30 (circled number 1 in FIG. 8). The MFP 10 reproduces a screen on its own Web browser with reference to the identification information object associated with a screen D2 that is currently displayed on the information terminal 20 via the Web server; the MFP 10 then obtains the second screen information by capturing the screen (circled number 2 in FIG. 8). The MFP 10 further obtains the first screen information by capturing a screen D1 that is currently displayed on the display 134 via the Web browser (circled number 2 in FIG. 8). The MFP 10 then transmits the first and second screen information to the information processing apparatus 30 (circled number 3 in FIG. 8).

The first and second screen information will be received by the information processing apparatus 30. As instructed by the CPU 31, the first screen D1 of the MFP 10 and the second screen D2 of the information terminal 20 will be reproduced on the display 35 on the basis of the first and second screen information.

As described above, in one or more embodiments referred to in FIG. 8, the MFP 10 does not request the information terminal 20 to return the second screen information. Instead, the MFP 10 obtains the second screen information by creating a captured screen with reference to the identification information object associated with the current screen of the information terminal 20.

Figure 9:
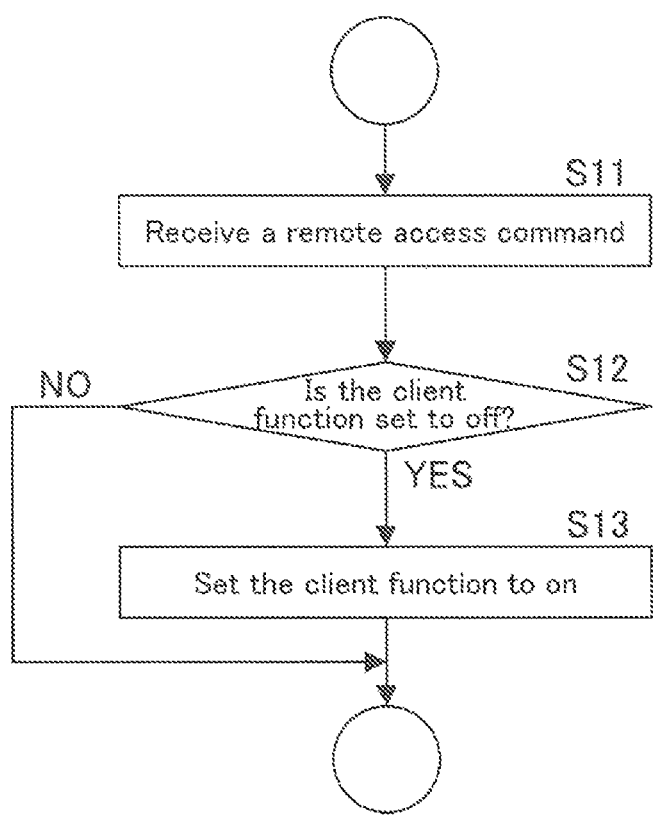
FIG. 9 is a flowchart representing an operation to be performed by the image processing apparatus having a Web server, which is setting a client function to be enabled in case it is disabled, according to one or more embodiments.

In one or more embodiments of FIG. 8, the client function is set to be enabled on the MFP 10 having a Web server in case it is disabled. This operation will be further described with reference to the flowchart of FIG. 9.

In Step S11, a remote access command is received from the information processing apparatus 30. In Step S12, it is judged whether or not the client function is disabled (off). If the client function is disabled (YES in Step S12), it is then set to be enabled (on) in Step S13. If it is not disabled (NO in Step S12), the routine terminates immediately.

In one or more embodiments of FIG. 8, the MFP 10 has a Web server. In this case, it is possible that one information terminal 20 is interrupted by a forcible termination of the remote support mode depending on the operations of other information terminals 20 while these multiple information terminals 20 are accessing the Web server at the same time.

To avoid such troubles, in one or more embodiments, the MFP 10 allows only one information terminal 20 to use the MFP 10 itself when receiving a remote access command. This operation will be further described with reference to the flowchart of FIG. 10.

In Step S21, a remote access command is received from the information processing apparatus 30. In Step S22, it is judged whether or not any information terminal 20 is accessing the Web server of the MFP 10 i.e. any information terminal 20 is operating in sync with the MFP 10. If no information terminal 20 is accessing the Web server (NO in Step S22), the routine terminates immediately. If any information terminal 20 is accessing the Web server (YES in Step S22), it is then judged in Step S23 whether or not two or more information terminals 20 are accessing the Web server of the MFP 10. If two or more information terminals 20 are accessing the Web server (YES in Step S23), the routine proceeds to Step S25, in which the IP information of the information terminal 20 having most recently accessed the Web server for remote support is obtained with reference to an access log. The routine then proceeds to Step S26. If two or more information terminals 20 are not accessing the Web server (NO in Step S23), the routine proceeds to Step S24, in which the IP information of the information terminal 20 currently accessing the Web server is obtained with reference to an access log. The routine then proceeds to Step S26.

In Step S26, the current network setting is recorded. In Step S27, the network setting is changed such that an error screen with the message "the server is unavailable" will be displayed when access from any information terminal 20 other than the information terminal 20 whose IP information has just been obtained is detected. As described above, access from any information terminal 20 other than the information terminal 20 currently accessing or having most recently accessed the MFP 10 will be redirected to an error screen with the message "the server is unavailable", and such an information terminal 20 will not be able to operate in sync with the MFP 10. With an error screen with the message "the server is unavailable", the user of the information terminal 20 will be able to know that the MFP 10 is now unavailable.

After the setting is changed in Step S27 such that an error screen with the message "the server is unavailable" will be displayed, the first and second screen information will be obtained and transmitted to the information processing apparatus 30 as described above with reference to FIGS. 6 and 7.

The setting may not be changed such that the access will be redirected to an error screen with the message "the server is unavailable"; instead, it may be changed such that access will be denied. This operation will be further described with reference to the flowchart of FIG. 11.

In Step S31, a remote access command is received from the information processing apparatus 30. In Step S32, it is judged whether or not any information terminal 20 is accessing the Web server of the MFP 10 i.e. any information terminal 20 is operating in sync with the MFP 10. If no information terminal 20 is accessing the Web server (NO in Step S32), the routine terminates immediately. If any information terminal 20 is accessing the Web server (YES in Step S32), it is then judged in Step S33 whether or not two or more information terminals 20 are accessing the Web server of the MFP 10. If two or more information terminals 20 are accessing the Web server (YES in Step S33), the routine proceeds to Step S35, in which the IP information of the information terminal 20 having most recently accessed the Web server for remote support is identified with reference to the access log. The routine then proceeds to Step S36. If two or more information terminals 20 are not accessing the Web server (NO in Step S33), the routine proceeds to Step S34, in which the IP information of the information terminal 20 currently accessing the Web server is identified with reference to the access log. The routine then proceeds to Step S36.

In Step S36, the current network setting is recorded. In Step S37, the network setting is changed such that access from any information terminal 20 other than the information terminal 20 whose IP information has just been obtained will be denied. As described above, access from any information terminal 20 other than the information terminal 20 currently accessing or having most recently accessed the MFP 10 will be denied.

Figure 10:
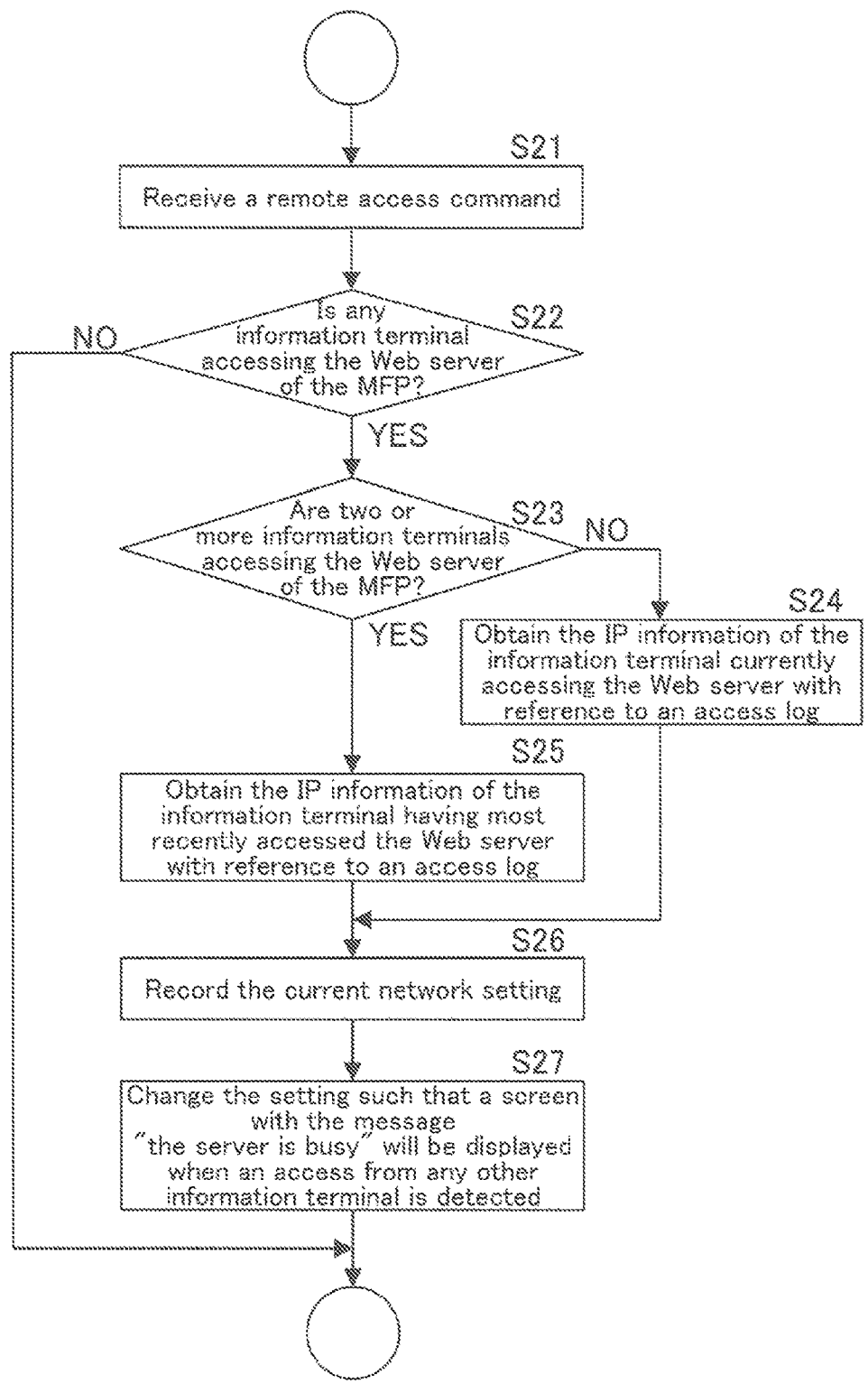
FIG. 10 is a flowchart representing an operation to be performed by the image processing apparatus when the image processing apparatus receives a synchronous display start command, which is allowing only one information terminal apparatus to use the image processing apparatus, according to one or more embodiments.
Figure 11:
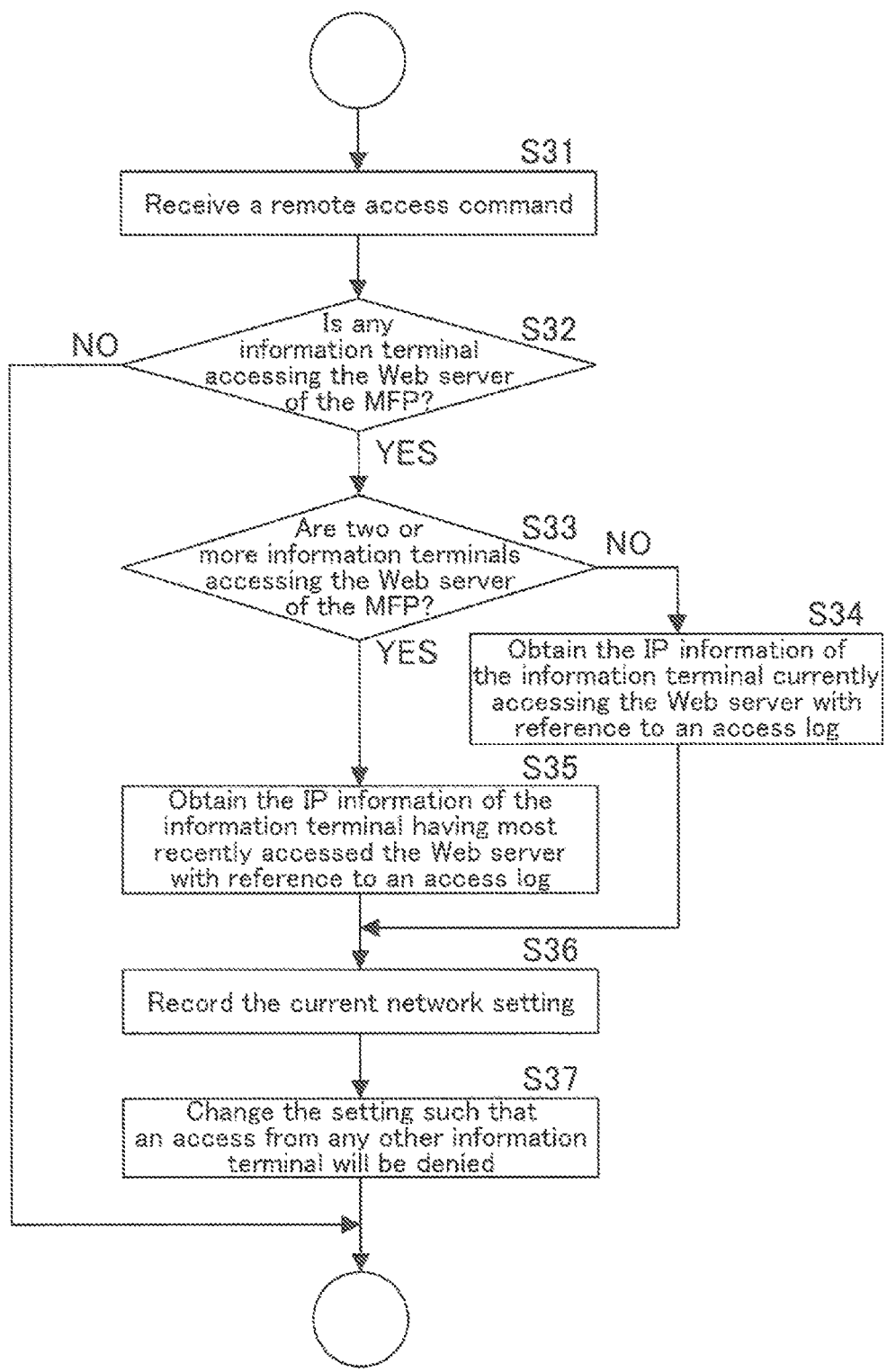
FIG. 11 is a flowchart representing an operation to be performed by the image processing apparatus when the image processing apparatus receives a synchronous display start command, which is denying access from an information terminal apparatus, according to one or more embodiments.

In one or more embodiments, when the remote support mode is terminated, the setting changed in Step S27 of FIG. 10 and in Step S37 of FIG. 11 is restored to its last state before the start of the remote support mode.

Figure 12:
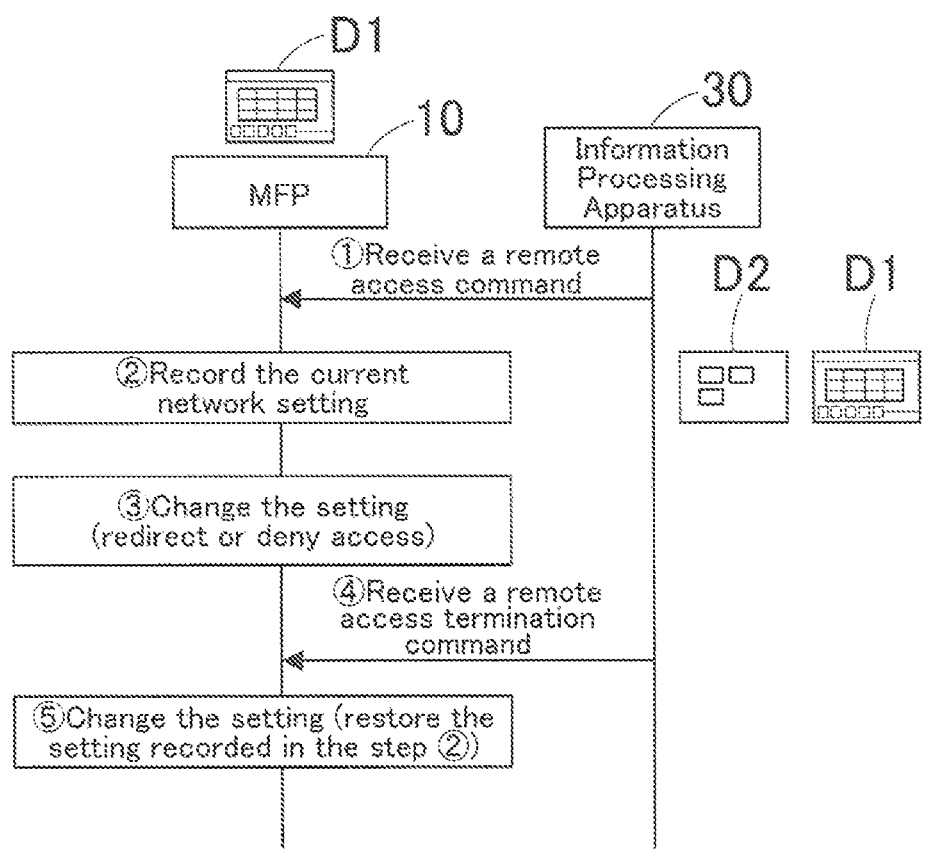
FIG. 12 is a view for reference in describing an operation to be performed by the image processing apparatus when a remote support mode is terminated, which is restoring the last setting before the start of the remote support mode, according to one or more embodiments.

As illustrated in FIG. 12, the MFP 10 receives a remote access command from the information processing apparatus 30 (circled number 1 in FIG. 12). The MFP 10 then records the current network setting (circled number 2 in FIG. 12) and changes the setting (circled number 3 in FIG. 12). After that, the MFP 10 receives a remote access termination command (synchronous display termination command) (circled number 4 in FIG. 12). The MFP 10 then restores the network setting to the last settings recorded in the step of circled number 2 (circled number 5 in FIG. 12).

Figure 13:
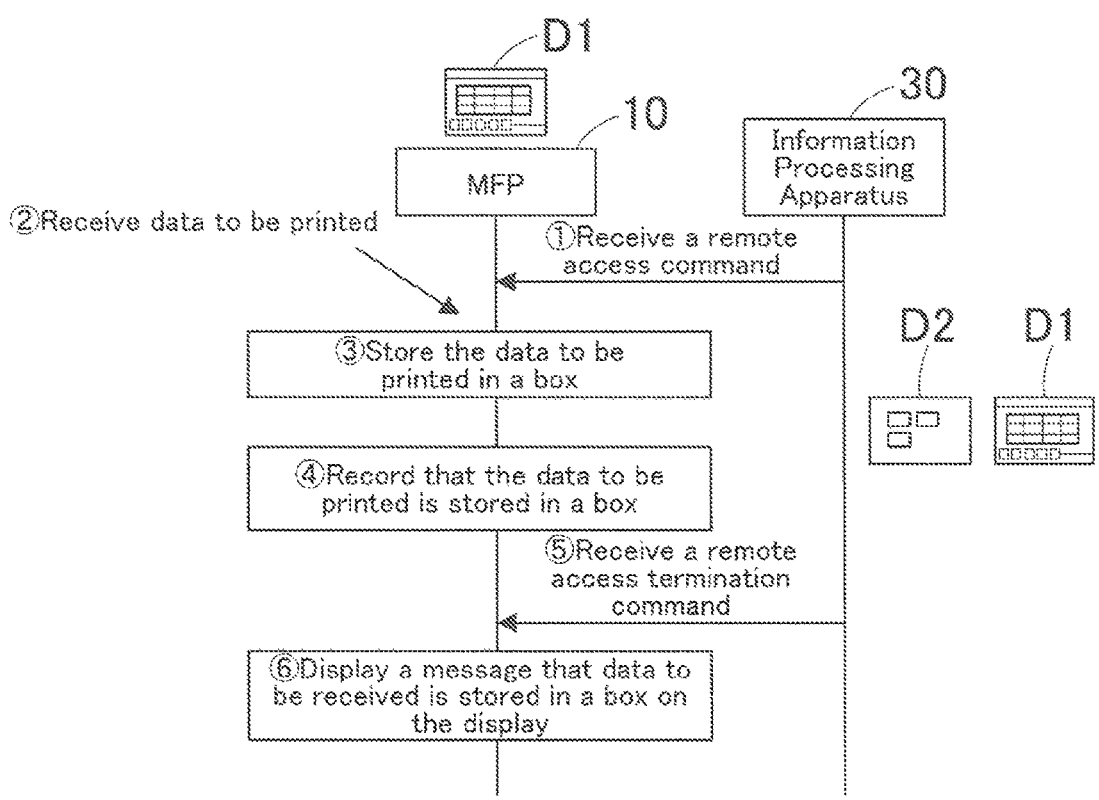
FIG. 13 is a view for reference in describing yet another procedure to be followed by the remote support system when the image processing apparatus receives a synchronous display start command from the information processing apparatus according to one or more embodiments.

FIG. 13 is a view for reference in describing yet another operation to be followed by the remote support system 1 when the MFP 10 receives a synchronous display start command from the information processing apparatus 30.

In this example, the MFP 10 receives a synchronous display start command from the information processing apparatus 30, and further receives data to be printed such as facsimile or print data from an external apparatus before receiving a synchronous display termination command. The MFP 10 is capable of storing the data in a box when receiving it and notifying the user of the data stored in the box after receiving a synchronous display termination command. The MFP 10 may receive a synchronous display termination command that is issued by the user via the operation panel 130.

As illustrated in FIG. 13, the MFP 10 receives a synchronous display start command (remote access command) from the information processing apparatus 30 (circled number 1 in FIG. 13). While the remote support mode is on, the MFP 10 receives data to be printed from an external apparatus (circled number 2 in FIG. 13), stores the received data in a box (circled number 3 in FIG. 13), and records that it is stored in the box (circled number 4 in FIG. 13).

After that, the MFP 10 receives a synchronous display termination command (remote access termination command) from the information processing apparatus 30 (circled number 5 in FIG. 13). The MFP 10 then displays a message that data to be received is stored in the box on the display 134 (circled number 6 in FIG. 13).

With this message, the user will be able to give an instruction to print the data in the box after the termination of the remote support mode.

Figure 14:
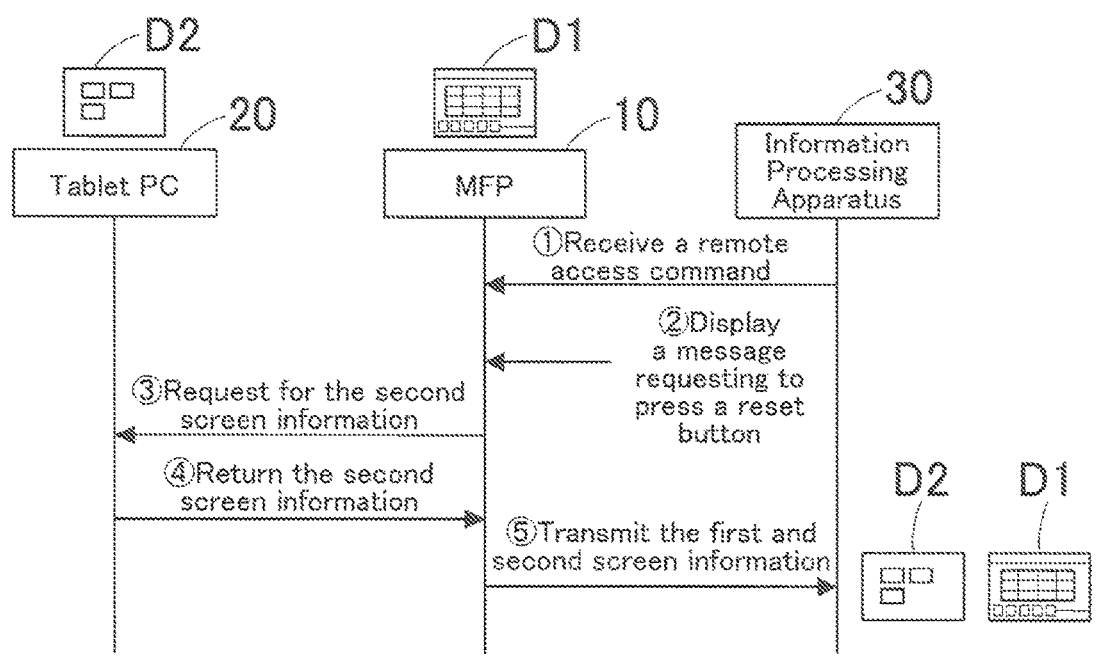
FIG. 14 is a view for reference in describing still yet another procedure to be followed by the remote support system when the image processing apparatus receives a synchronous display start command from the information processing apparatus according to one or more embodiments.

FIG. 14 is a view for reference in describing still yet another operation to be followed by the remote support system 1 when the MFP 10 receives a synchronous display start command from the information processing apparatus 30.

The MFP 10 receives a remote access command from the information processing apparatus 30 (circled number 1 in FIG. 14). The MFP 10 then displays a message requesting to press a reset button on the display 134 (circled number 2 in FIG. 14).

Upon the pressing of the reset button by the user, the MFP 10 requests the information terminal 20 to return the second screen information on a second screen D2 displayed on the display 220 (circled number 3 in FIG. 14). The MFP 10 receives the second screen information from the information terminal 20 (circled number 4 in FIG. 14). The MFP 10 then transmits, to the information processing apparatus 30, the first screen information on a first screen D1 displayed on the display 134 of the MFP 10 itself and the second screen information received from the information terminal 20 (circled number 5 in FIG. 14).

The first and second screen information will be received by the information processing apparatus 30. As instructed by the CPU 31, the first screen D1 of the MFP 10 and the second screen D2 of the information terminal 20 will be reproduced on the display 35 on the basis of the first and second screen information.

As described above, in one or more embodiments, the MFP 10 requests the information terminal 20 to return the second screen information upon the pressing of the reset button by the user. By pressing the reset button, the user will be able to receive support on the screen, which is updated by pressing the reset button, remotely. The information processing apparatus 30 will receive the second screen information on the updated screen, instead of a useless screen having been displayed before the pressing of the reset button. So, the operator in the support service center will be able to provide accurate support remotely to the user.

In one or more embodiments, the procedure from the step of requesting for the second screen information (circled number 2 in FIG. 14) to the step of transmitting the first and second screen information (circled number 5 in FIG. 14) is repeated periodically. The information processing apparatus 30 is thus allowed to update the first screen D1 and the second screen D2 automatically.

Hereinafter, an example of the operation illustrated in FIG. 14 will be described in concrete terms.

The MFP 10 and the information terminal 20 are capable of operating in sync with each other using their synchronous applications called PAGESCOPE web connection (PSWC). PSWC runs on a Web browser. PSWC allows the user to view error and warning conditions of the MFP 10 from the information terminal 20. PSWC has a function (direct printing) that allows the user to send a print job directly to the MFP 10 by selecting a PDF file from a list on a special Web page.

When the user fails to obtain print by the MFP 10 using direct printing, the user can call the support service center for remote support to solve such troubles.

Following the procedure illustrated in FIG. 14, in this case, the information processing apparatus 30 receives the first and second screen information from the MFP 10 and the information terminal 20, reproduces a screen of the MFP 10 and a screen of the information terminal 20 on the display 35.

With the screen of the information terminal 20, the operator determines that this trouble is caused by the user failing to press the "Send" button after selecting a PDF file. The operator thus advises the user over the telephone to press the "Send" button.

The information processing apparatus 30 continues receiving the first and second screen information from the MFP 10 and the information terminal 20 periodically. After talking over the telephone, the operator finds the message "the file has been successfully sent" on the updated screen of the information terminal 20. With this message, the operator confirms that the user successfully completed the manipulation. At the same time, the operator finds a tray selection screen of the MFP 10. This means, the MFP 10 receives the PDF file successfully, but runs out of sheets of paper specified by the PDF file. Monitoring the situation for several minutes, the operator in the support service center determines that the MFP 10 will only continue displaying the same screen (cannot start printing) and calls the user to advise to specify a paper feed tray.

As described above, even while the MFP 10 and the information terminal 20 are operating in sync with each other, the operator in the support service center is allowed to determine the exact step where the user is stuck and provide accurate support remotely to the user.

Hereinafter, an operation to be performed by the information processing apparatus 30 after receiving the first and second screen information and reproducing a first screen of the MFP 10 and a second screen of the information terminal 20 on the display 35 will be described. The operation is transmitting predetermined information addressed to the MFP 10 or the information terminal 20, to the MFP 10.

The information processing apparatus 30 transmits information to the MFP 10 along with a tag file having an identifier that specifies the MFP 10 or the information terminal 20 as the destination address. The information is at least one of image (including video) information, voice information, and settings information; the image and voice information can be reproduced by the MFP 10 and the information terminal 20 and the settings information can be reflected by the MFP 10 and the information terminal 20.

Figure 15:
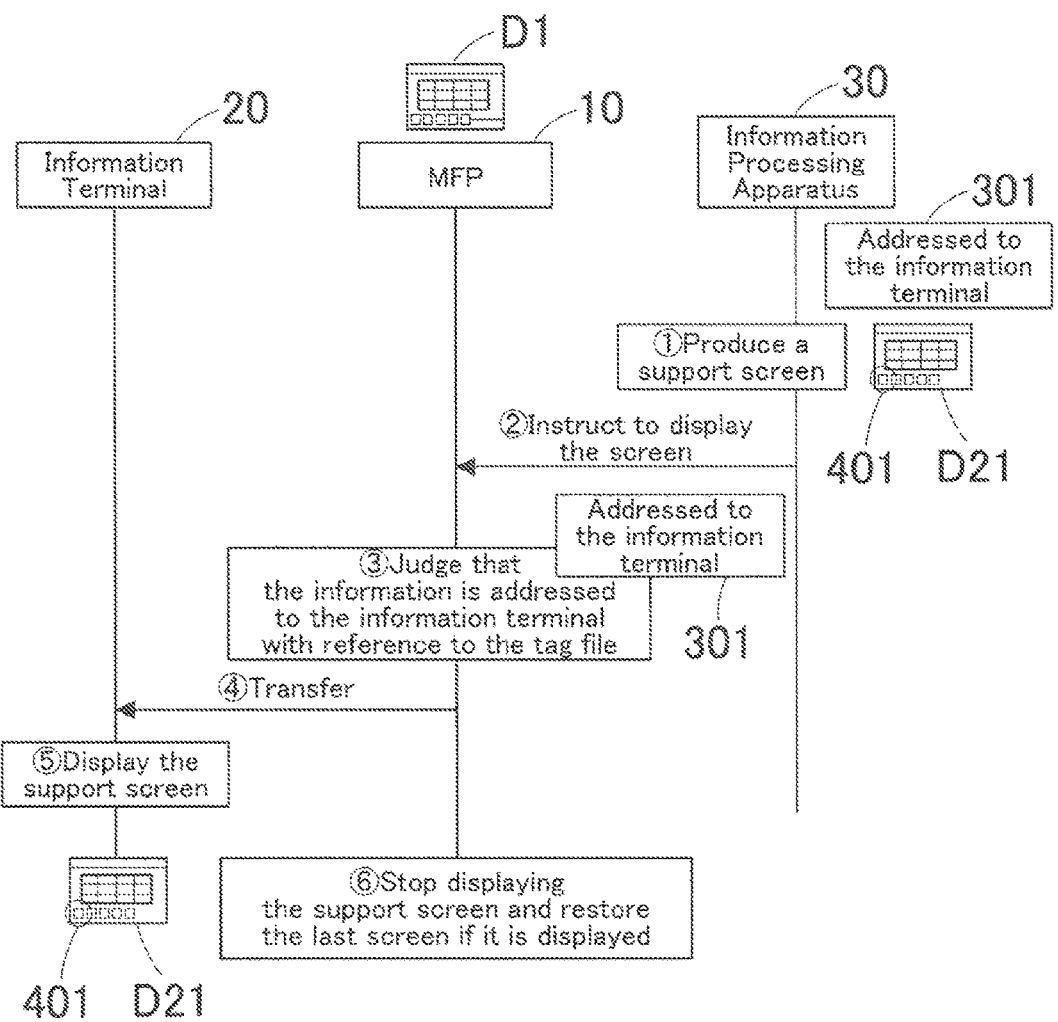
FIG. 15 is a view for reference in describing a procedure to be followed by the remote support system when the information processing apparatus transmits predetermined information addressed to the image processing apparatus or the information terminal apparatus, to the image processing apparatus according to one or more embodiments.

As illustrated in FIG. 15, the information processing apparatus 30 produces a support screen D21 for support in the step where the user is stuck, for example (circled number 1 in FIG. 15). The information processing apparatus 30 then instructs the MFP 10 to display the support screen D21 by transmitting image information of the screen to the MFP 10 along with a tag file 301 that specifies the information terminal 20 as the destination address (circled number 2 in FIG. 15). The support screen D21 is a screen with a certain button marked by a red circle. The MFP 10 judges (determines) that the image information is addressed to the information terminal 20 with reference to the tag file 301 attached to the image information (circled number 3 in FIG. 15). The MFP 10 then transfers the image information to the information terminal 20 (circled number 4 in FIG. 15).

The information terminal 20 displays the support screen D21 on the basis of the image information received therefrom (circled number 5 in FIG. 15).

If the MFP 10 displays the support screen D21, which is originated from the information processing apparatus 30, on the display 134, the MFP 10 stop displaying it and returns to the last screen before it (circled number 6 in FIG. 15). As indicated in the support screen D21 displayed on the information terminal 20, the user will be able to continue the manipulation of the MFP 10.

In the operation referred to in FIG. 15, the MFP 10 receives image information addressed to the information terminal 20, from the information processing apparatus 30. When the MFP 10 receives image information addressed to the MFP 10 itself, the MFP 10 reproduces a support screen D21. The MFP 10 may receive, instead of image information, voice information or settings information that can be reflected, from the information processing apparatus 30. As in the case with image information, the MFP 10 also judges whether it is addressed to the MFP 10 or the information terminal 20 with reference to the tag file 301.

The information processing apparatus 30 may not produce a support screen D21 to transmit image information to the MFP 10. Instead, the information processing apparatus 30 may transmit coordinates and a red circle to be given to the position, along with a tag file instructing the MFP 10 or the information terminal 20 to execute processing. Alternatively, the information processing apparatus 30 may transmit voice data along with a tag file instructing the MFP 10 or the information terminal 20 to execute processing.

More specifically, image information, voice information, or settings information to be transmitted to the MFP 10 by the information processing apparatus 30 constitutes a compressed file. By decompressing the compressed file, the MFP 10 obtains the two files: a tag file (text file) and an image/voice/settings file. The tag file (text file) contains either of the following lines described in text format:

a) Exec=information terminal 20
b) Exec=MFP 10

If the tag file contains the line a), the MFP 10 selects only the image/voice/settings file from the compressed file and transmits it to the information terminal 20 (to be precise, the MFP 10 transmits it to the synchronous application on the information terminal 20). If the tag file contains the line b), the MFP 10 executes the image/voice/settings file.

The execution method is determined by the filename extension given to the name of the image/voice/settings file. The filename extension "bmp", for example, allows the MFP 10 and the information terminal 20 to display the file on the display 134 and the display 220, respectively. The filename extension "WAV", for example, allows the MFP 10 and the information terminal 20 to reproduce voice. The image/voice/settings file with filename extension "MFP10" must be a text file containing coordinates and an image (marker) to be given to the position, described in text format.

Figure 16:
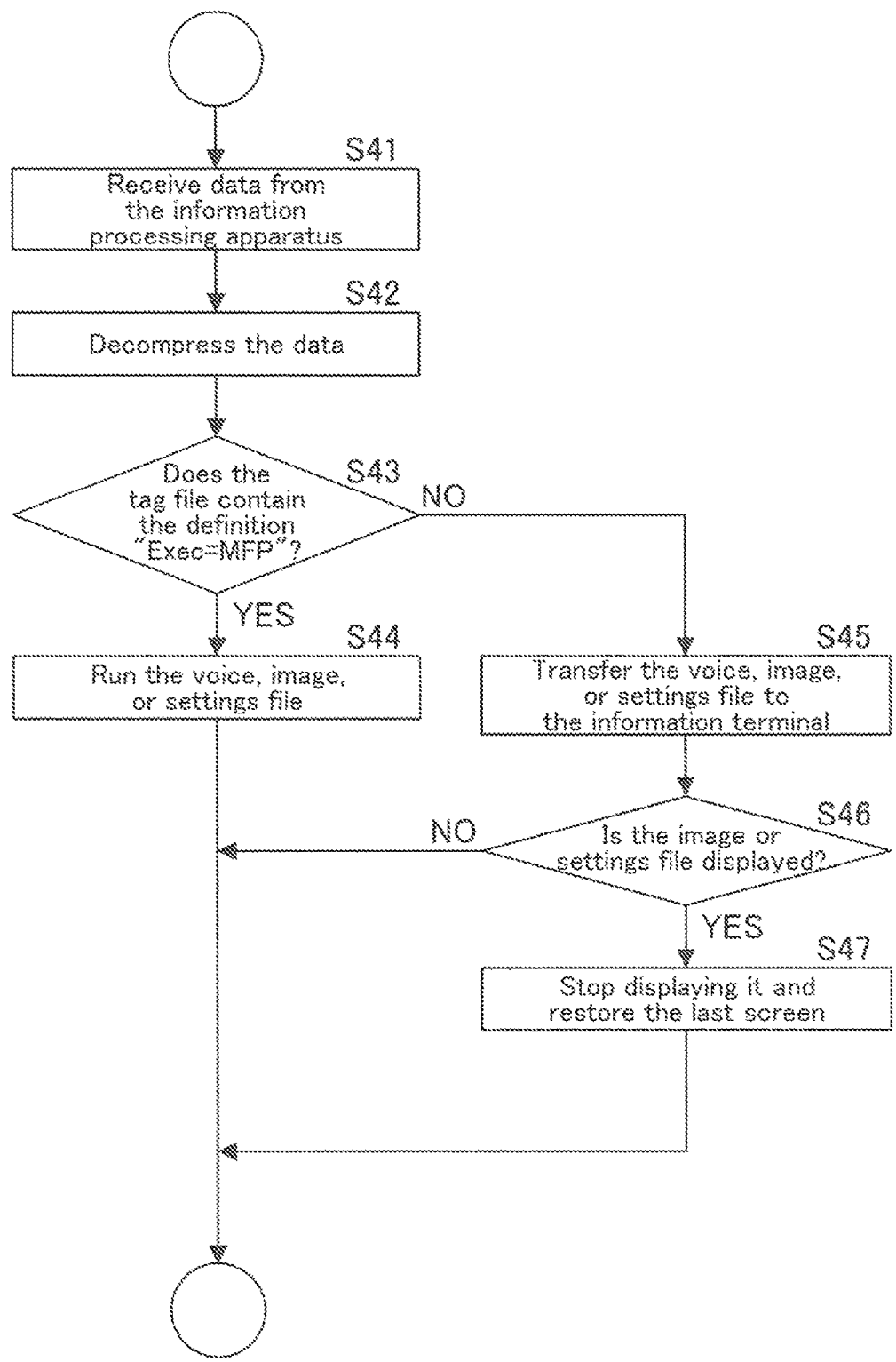
FIG. 16 is a flowchart representing an operation to be performed by the image processing apparatus in the remote support system referred to in FIG. 15 according to one or more embodiments.

FIG. 16 is a flowchart representing an operation to be performed by the MFP 10 in the remote support system 1 referred to in FIG. 15.

In Step S41, data (information) is received from the information processing apparatus 30; in Step S42, the received data is decompressed. In Step S43, it is judged whether or not the data is addressed to the MFP 10, by analyzing a tag file. If the data is addressed to the MFP 10 (YES in Step S43), a voice or image is reproduced, or a setting file is run in Step S44.

In Step S43, if the data is not addressed to the MFP 10 (NO in Step S43), the data is transferred to the information terminal 20 in Step S45. It is then judged in Step S46 whether or not the image or setting file is displayed on the display 134. If it is not displayed thereon (NO in Step S46), the routine terminates immediately. If the image or setting file is displayed thereon (YES in Step S46), the display of the file is stopped and the last screen is displayed in Step S47.

The information processing apparatus 30 transmits information to the MFP 10 along with a tag file that specifies the information terminal 20 as the destination address. The information is at least one of image (including video) information, voice information, and settings information; the image and voice information can be reproduced and the settings information can be reflected. The procedure to be followed by the remote support system 1 in the case where the MFP 10 has a Web server and the information terminal 20 obtains a screen via the Web server will be described with reference to FIG. 17

Figure 17:
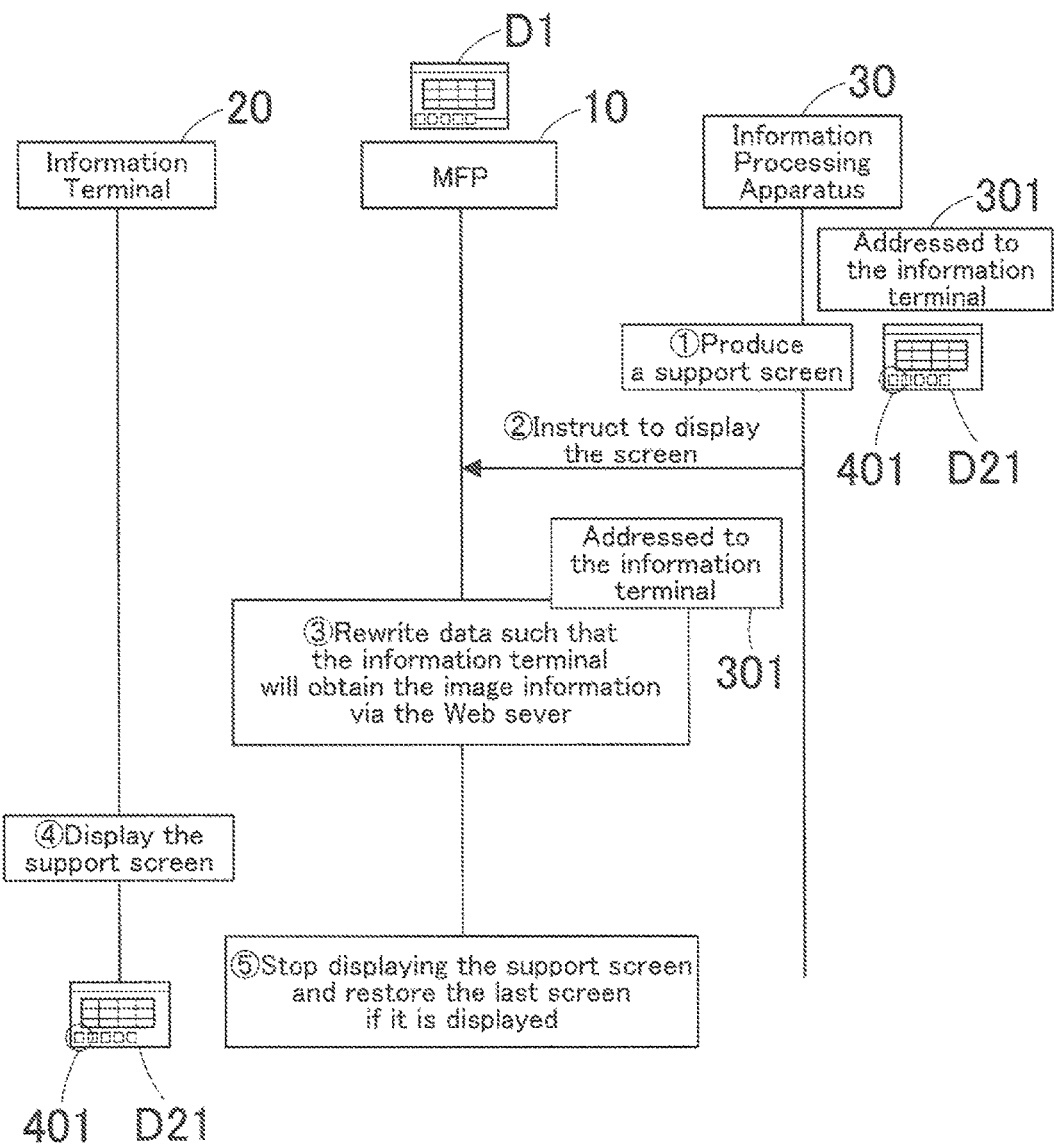
FIG. 17 is a view for reference in describing a procedure to be followed by the remote support system when the information processing apparatus transmits predetermined information addressed to the image processing apparatus or the information terminal apparatus, to the image processing apparatus having a Web server, according to one or more embodiments.

The information processing apparatus 30 produces a support screen D21 for support in the step where the user is stuck (circled number 1 in FIG. 17). The information processing apparatus 30 then instructs the MFP 10 to display the support screen 21 by transmitting image information of the screen to the MFP 10 along with a tag file 301 that specifies the information terminal 20 as the destination address (circled number 2 in FIG. 17). The MFP 10 judges that the image information is addressed to the information terminal 20 with reference to the tag file 301 attached to the image information; the MFP 10 then rewrites data such that the information terminal 20 will obtain the image information via the Web server (circled number 3 in FIG. 17).

The information terminal 20 obtains the image information via the Web server and displays the support screen D21 (circled number 4 in FIG. 17).

If the MFP 10 displays the support screen D21, which is originated from the information processing apparatus 30, on the display 134, the MFP 10 stops displaying it and returns to the last screen before it (circled number 5 in FIG. 17). As indicated in the support screen D21 displayed on the information terminal 20, the user will be able to continue the manipulation of the MFP 10.

The MFP 10 may store at least one of the image information, voice information, and setting information, which is addressed to the MFP 10 itself, on the fixed storage 110 for later use; similarly, the information terminal 20 also may store at least one of the image information, voice information, and settings information, which is addressed to the information terminal 20 itself, on the fixed storage 210 for later use. In this case, the user will be able to review support information received from the information processing apparatus 30, even after the termination of the remote support mode.

Figure 18:
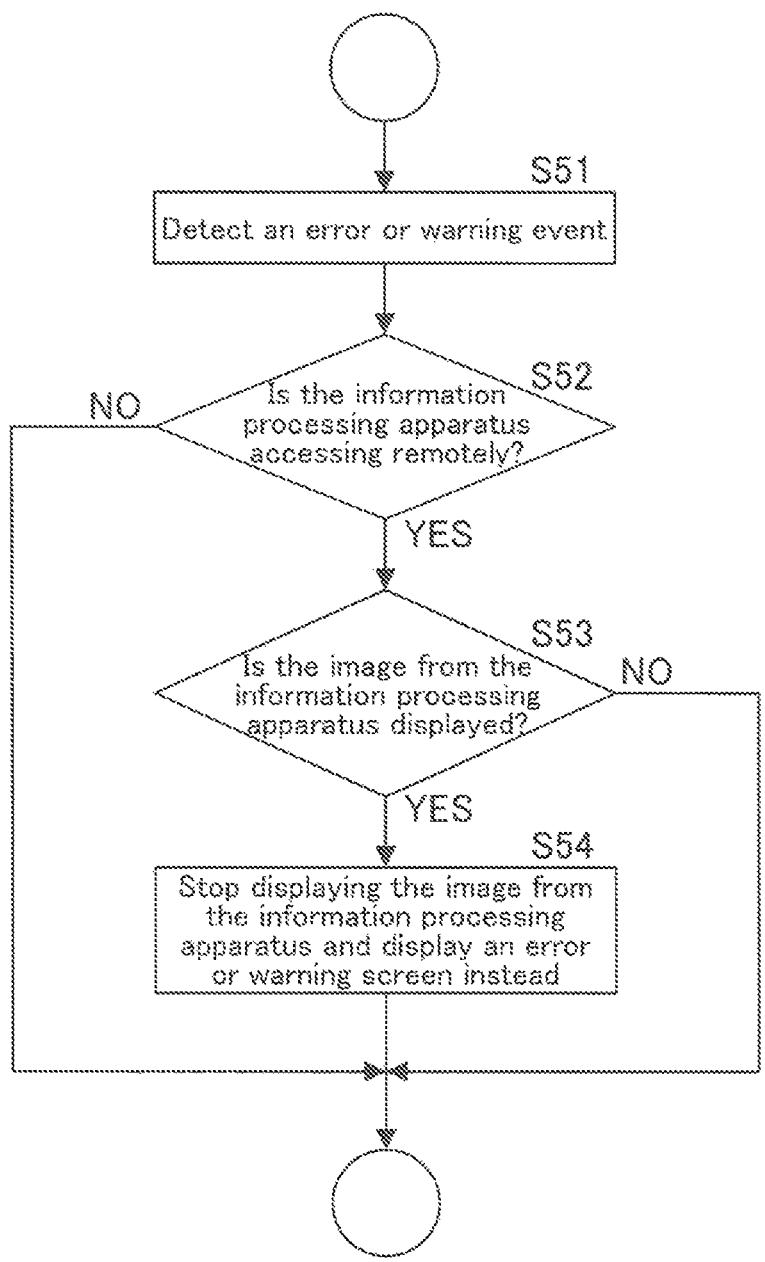
FIG. 18 is a flowchart representing another operation to be performed by the image processing apparatus according to one or more embodiments.

FIG. 18 is a flowchart representing another operation to be performed by the MFP 10. In this example, an error or warning event occurs on the MFP 10 while the information processing apparatus 30 is accessing the MFP 10 remotely (while the remote support mode is on).

In Step S51, an error or warning event on the MFP 10 is detected; in Step S52, it is judged whether the information processing apparatus 30 is accessing the MFP 10 remotely. If it is not accessing the MFP 10 remotely (NO in Step S52), the routine terminates, and a normal operation for the error or warning event will be performed.

If it is accessing the MFP 10 remotely (YES in Step S52), it is further judged in Step S53 whether or not an image originated from the information processing apparatus 30 is currently displayed. If such an image is currently displayed (YES in Step S53), the display of the image is stopped and an error or warning screen is displayed instead in Step S54. If an image originated from the information processing apparatus 30 is not currently displayed (NO in Step S53), the routine terminates, and a normal operation for the error or warning event will be performed.

As described above, if the MFP 10 is currently displaying an image originated from the information processing apparatus 30, the MFP 10 stops displaying it and displays an error or warning screen instead. With this screen, the user will be able to find the presence of an error or warning event easily.

Figure 19:
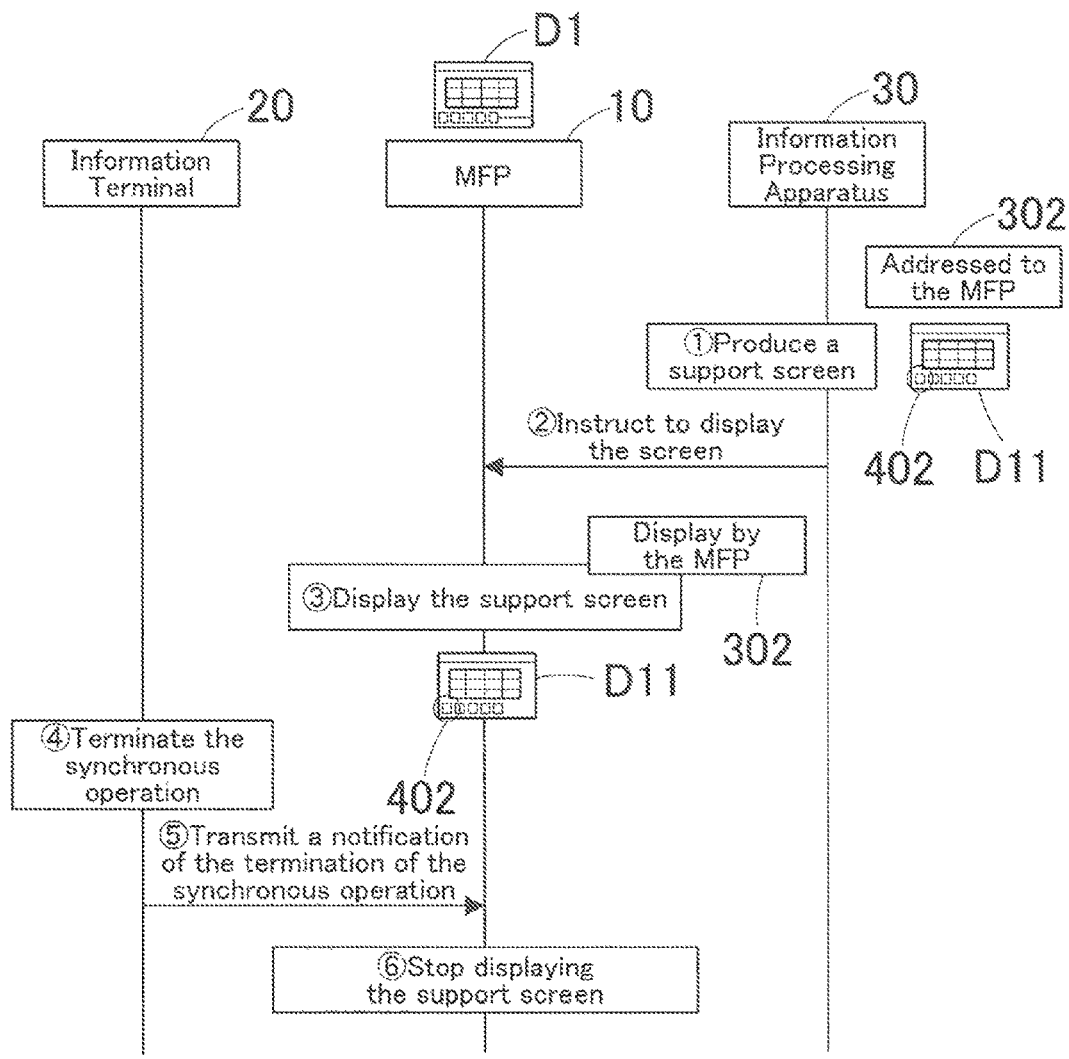
FIG. 19 is an explanatory view of one or more embodiments of the present invention.

FIG. 19 is an explanatory view of one or more embodiments of the present invention.

The information processing apparatus 30 produces a support screen D11 (circled number 1 in FIG. 19). The information processing apparatus 30 then instructs the MFP 10 to display the support screen D11 by transmitting image information of the screen to the MFP 10 along with a tag file 302 having an identifier that specifies the MFP 10 as the destination address (circled number 2 in FIG. 19). The support screen D11 is a screen with a certain button marked by a red circle. The MFP 10 judges that the image information is addressed to the MFP 10 itself with reference to the tag file 302 attached to the image information (circled number 3 in FIG. 19). The MFP 10 then displays the support screen D11 on the display 134 (circled number 3 in FIG. 19).

After that, the information terminal 20 terminates operating in sync with the MFP 10 as instructed by the user (circled number 4 in FIG. 19) and transmits a notification of the termination of the synchronous operation to the MFP 10 (circled number 5 in FIG. 19). The MFP 10 then stops displaying the support screen D11 originated from the information processing apparatus 30 (circled number 6 in FIG. 19).

As described above, when the information terminal 20 terminates operating in sync with the MFP 10, the MFP 10 stops displaying the support screen D11 originated from the information processing apparatus 30. The user will be able to smoothly continue the manipulation of the MFP 10, accordingly.

While some embodiments of the present invention have been described in detail herein, it should be understood that the present invention is not limited to these embodiments.

In the above-described embodiments, the first and second screen information is a captured screen, for example; alternatively, it is an identification information object associated with a screen if the image processing apparatus 30 has a function for it. However, when the user receives support to input a text to the MFP 10 from the information terminal 20, the second screen information is a captured screen according to one or more embodiments. On the basis of the captured screen received therefrom, the information processing apparatus 30 displays the captured screen with a text being input. With this screen, the operator in the support service center will be able to read the text on the captured screen for better support. The information processing apparatus 30 may also have a character recognition function for recognizing characters such that the information processing apparatus 30 recognizes a text received along with the second screen information and reproduces the text to give it on the screen. In this case, the second screen information is a captured screen or an identification information object associated with a screen, whichever.

Furthermore, in the above-described embodiments, the MFP 10 receives a synchronous display start command from the information processing apparatus 30 or from the operation panel 130 of the MFP 10 itself. The MFP 10 obtains the second screen information of the information terminal 20 and transfers it to the information processing apparatus 30 along with the first screen information of the MFP 10 itself. The MFP 10 further receives image information, voice information, or settings information from the information processing apparatus 30; and then, if the information is addressed to the information terminal 20, the MFP 10 transfers it to the information terminal 20.

Alternatively, the information terminal 20, instead of the MFP 10, may perform the same. That is, in this case, the information terminal 20 receives a synchronous display start command from the information processing apparatus 30 or from the touch screen panel 230 of the information terminal 20 itself. The information terminal 20 obtains the first screen information of the MFP 10 and transfers it to the information processing apparatus 30 along with the second screen information of the information terminal 20 itself. The information terminal 20 further receives image information, voice information, or settings information from the information processing apparatus 30; and then, if the information is addressed to the MFP 10, the information terminal 20 transfers it to the MFP 10. In this case, the information terminal 20, instead of the MFP 10, performs the same operation as described above with reference to the relevant figures.

Yet alternatively, either one of the MFP 10 and the information terminal 20, whichever receives a synchronous display start command from the information processing apparatus 30 while the MFP 10 and the information terminal 20 are operating in sync with each other, may perform the same. That is, in this case, either one of the MFP 10 and the information terminal 20, whichever receives a synchronous display start commands, obtains its own screen information, transfers it to the information processing apparatus 30, and also requests the other one to transmit the other one's own screen information to the information processing apparatus 30. The information processing apparatus 30 thus receives the first and second screen information separately from the MFP 10 and the information terminal 20, and displays screens on the display 35.

Figure 20:
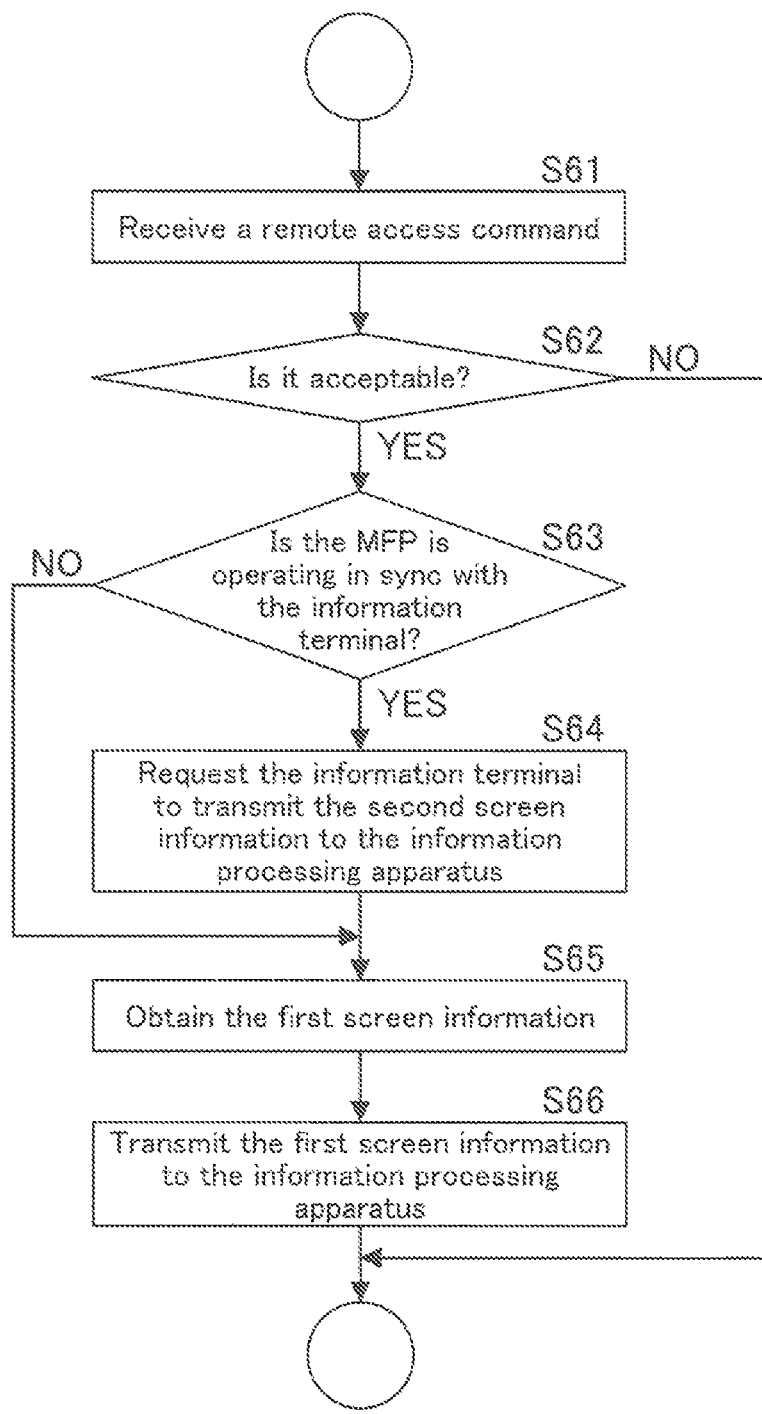
FIG. 20 is a flowchart representing an operation to be performed by the image processing apparatus when the image processing apparatus receives a synchronous display start command, in one or more embodiments in which the image processing apparatus and the information terminal apparatus transmit their own screen information separately to the information processing apparatus.

FIG. 20 is a flowchart representing an operation to be performed by the CPU 101 of the MFP 10 when receiving a synchronous display start command, in one or more embodiments in which the MFP 10 and the information terminal 20 transmit their own screen information separately. This operation may be alternatively performed by the information terminal 20, instead of the MFP 10.

In Step S61, a remote access command is received from the information processing apparatus 30; in Step S62, it is judged whether a remote access command is acceptable. If it is not acceptable (NO in Step S62), the routine terminates. If it is acceptable (YES in Step S62), then it is judged in Step S63 whether or not the MFP 10 is operating in sync with the information terminal 20.

In Step S63, if it is operating in sync with the information terminal 20 (YES in Step S63), the information terminal 20 is requested to transmit the second screen information to the information processing apparatus 30 in Step S64. The routine then proceeds to Step S65. Meanwhile, the information terminal 20 transmits the second screen information to the information processing apparatus 30 as requested. Back to Step S63, if the MFP 10 is not operating in sync with the information terminal 20 (NO in Step S63), the routine proceeds directly to Step S65.

In Step S65, the first screen information on the screen D1 of the MFP 10 is obtained; in Step S66, the first screen information is transmitted to the information processing apparatus 30.

The information processing apparatus 30 will receive the first and second screen information separately from the MFP 10 and the information terminal 20. The information processing apparatus 30 will then reproduce the first screen D1 of the MFP 10 and the second screen D2 of the information terminal 20 together on the display 35 on the basis of the first and second screen information. If the MFP 10 is not operating in sync with the information terminal 20, the information processing apparatus 30 will display only the first screen D1 of the MFP 10.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A remote support system comprising:
an image processing apparatus;
an information terminal apparatus; and
an information processing apparatus, wherein
the image processing apparatus, the information terminal apparatus and the information processing apparatus communicate with each other,
the information processing apparatus provides remote support,
the image processing apparatus comprises:
   a first hardware processor that allows the image processing apparatus to operate in sync with the information terminal apparatus; and
   a first display,
the information terminal apparatus comprises:
   a second hardware processor that allows the information terminal apparatus to operate in sync with the image processing apparatus; and
   a second display,
either or both of the first hardware processor and the second hardware processor execute the following operations:
   receiving a synchronous display start command;
   determining whether the image processing apparatus and the information terminal apparatus are operating in sync with each other;
   obtaining, when the image processing apparatus and the information terminal apparatus are operating in sync with each other, first and second screen information, wherein the first screen information is on a first screen displayed on the first display and the second screen information is on a second screen displayed on the second display; and
   transmitting the first and the second screen information to the information processing apparatus, and
the information processing apparatus comprises:
   a third display; and
   a third hardware processor that reproduces the first screen of the image processing apparatus and the second screen of the information terminal apparatus on the third display based on the first and the second screen information received from either the image processing apparatus or the information terminal apparatus, wherein:
the image processing apparatus has a Web server,
the second hardware processor further allows the information terminal apparatus to operate in sync with the image processing apparatus via the Web server;
the first hardware processor executes the following operations:
   receiving a synchronous display start command;
   determining whether the image processing apparatus and the information terminal apparatus are operating in sync with each other;
   obtaining, when the image processing apparatus and the information terminal apparatus are operating in sync with each other, first and second screen information, wherein the first screen information is on a first screen displayed on the first display and the second screen information is on a second screen displayed on the second display;
   transmitting the first and the second screen information to the information processing apparatus; and analyzing an access log recording accesses to the Web server when the first hardware processor receives a synchronous display start command; and
   determining that the image processing apparatus is operating in sync with the information terminal apparatus by determining that the information terminal apparatus is accessing the Web server periodically, and
the image processing apparatus further comprises:
   a first storage that stores identification information objects associated with screens to be displayed on the second display of the information terminal apparatus via the Web server, and
   the first hardware processor obtains the second screen information by creating a captured screen with reference to the identification information object associated with the second screen.

2. The remote support system according to claim 1, wherein:
the first hardware processor obtains the second screen information by requesting the information terminal apparatus to return the second screen information, or the second hardware processor obtains the first screen information by requesting the image processing apparatus to return the first screen information; and
the image processing apparatus or the information terminal apparatus returns its screen information as requested.

3. The remote support system according to claim 1, wherein:
the image processing apparatus has a client function; and
the first hardware processor sets the client function to be enabled if it is disabled when a synchronous display start command is received.

4. The remote support system according to claim 1, wherein the first hardware processor further executes the following operations:
selecting one of multiple the information terminal apparatuses operating in sync with the image processing apparatus when a synchronous display start command is received; and
redirecting access from any other the information terminal apparatus than the one selected information terminal apparatus to a certain screen.

5. The remote support system according to claim 1, wherein the first hardware processor, upon receiving a synchronous display start command, denies access from any other external apparatus than the information terminal apparatus currently operating in sync with the image processing apparatus.

6. The remote support system according to claim 1, wherein the first hardware processor, upon receiving a synchronous display termination command after receiving the synchronous display start command, restores the settings of the image processing apparatus to the last state before receiving a synchronous display start command.

7. The remote support system according to claim 1, wherein the first hardware processor, upon receiving the data to be printed after receiving a synchronous display start command but before receiving a synchronous display termination command, stores data to be printed on a first storage instead of executing printing.

8. The remote support system according to claim 7, wherein the first hardware processor causes a message to be displayed on the first display or on the second display, wherein the message notifies that the data to be printed is stored on the storage, when the synchronous display termination command is received.

9. The remote support system according to claim 1, wherein:
the first and the second screen information is an identification information object associated with a screen;
the information processing apparatus further comprises:
a third storage that stores the identification information objects associated with the screens; and
the third hardware processor produces a screen for the image processing apparatus and a screen for the information terminal apparatus with reference to the identification information objects stored on the third storage.

10. The remote support system according to claim 1, wherein:
either the image processing apparatus or the information terminal apparatus further comprises:
a console; and
the either one comprising the console obtains the first and the second screen information when a certain button is pressed via the console after its hardware processor receives a synchronous display start command.

11. The remote support system according to claim 1, wherein either or both of the first and the second hardware processor transmit the first and the second screen information periodically to the information processing apparatus.

12. The remote support system according to claim 1, wherein:
the third hardware processor transmits information to the image processing apparatus or the information terminal apparatus along with an identifier indicating whether the information is addressed to the image processing apparatus or the information terminal apparatus, wherein
the information is at least one of image information, voice information, and settings information,
the image and voice information is reproduced by the image processing apparatus and the information terminal apparatus, and
the settings information is reflected by the image processing apparatus and the information terminal apparatus;
either the first or the second hardware processor determines whether the information received from the information processing apparatus is addressed to the image processing apparatus or the information terminal apparatus, with reference to the identifier; and
either the first hardware processor reproduces or reflects the information where the information is addressed to the image processing apparatus or transfers the information to the information terminal apparatus where the information is addressed to the information terminal apparatus, or alternatively, the second hardware processor reproduces or reflects the information where the information is addressed to the information terminal apparatus or transfers the information to the image processing apparatus where the information is addressed to the image processing apparatus.

13. The remote support system according to claim 12, wherein:
either the first hardware processor notifies the information terminal apparatus that the first hardware processor is reproducing or reflecting the information received from the information processing apparatus, or alternatively, the second hardware processor notifies the image processing apparatus that the second hardware processor is reproducing or reflecting the information received from the information processing apparatus, wherein the information is at least one of image information, voice information, and settings information, and
where the first or the second hardware processor is reproducing or reflecting the image information, voice information, or settings information when notified, the first or the second hardware processor stops reproducing or reflecting the information and restores the screen to allow continued manipulation.

14. The remote support system according to claim 12, wherein, where the first hardware processor detects an error event while the first hardware processor is reproducing the image or voice information received from the information processing apparatus, the first hardware processor displays an error screen on the first display that notifies the error event.

15. The remote support system according to claim 12, wherein, where the manipulation is terminated, the first or the second hardware processor stops reproducing the image or voice information received from the information processing apparatus.

16. The remote support system according to claim 12, wherein:
the information processing apparatus further comprises:
a first storage that stores information addressed to the information processing apparatus itself,
the information terminal apparatus further comprises:
a second storage that stores information addressed to the information terminal apparatus itself,
the information is at least one of image information, voice information, and settings information; and
either the first hardware processor reproduces or reflects at least one of image information, voice information, and settings information stored on the first storage, or alternatively, the second hardware processor reproduces or reflects at least one of image information, voice information, and settings information stored on the second storage.

17. The remote support system according to claim 1, wherein:
the third hardware processor transmits information to the image processing apparatus or the information terminal apparatus along with an identifier indicating whether the information is addressed to the image processing apparatus or the information terminal apparatus, wherein
the information is at least one of image information, voice information, and settings information,
the image and voice information is reproduced by the image processing apparatus and the information terminal apparatus, and
the settings information is reflected by the image processing apparatus and the information terminal apparatus;
the first hardware processor further executes the following operations:

determining whether the information received from the information processing apparatus is addressed to the image processing apparatus or the information terminal apparatus, with reference to the identifier; and reproducing or reflecting the information where the information is addressed to the image processing apparatus, or transferring the information to the information terminal apparatus via the Web server where the information is addressed to the information terminal apparatus.

18. The remote support system according to claim 1, wherein:

the first hardware processor obtains at least a captured screen and an identification information object as the second screen information, the identification information object associated with a screen; and the second hardware processor obtains a captured screen as the second screen information to input a text to the image processing apparatus, while the information terminal apparatus is operating in sync with the image processing apparatus.

19. A non-transitory computer-readable recording medium storing remote support programs for an image processing apparatus, wherein the image processing apparatus comprises:

an interface that communicates with an information terminal apparatus and an information processing apparatus, wherein the information processing apparatus provides remote support; and a first display, the programs cause the image processing apparatus to execute:

operating in sync with the information terminal apparatus;

receiving a synchronous display start command;

determining whether the image processing apparatus and the information terminal apparatus are operating in sync with each other;

obtaining both first and the second screen information, the first screen information being on a first screen displayed on the first display, the second screen information being on a second screen displayed on a second display of the information terminal apparatus, if the image processing apparatus and the information terminal apparatus are operating in sync with each other; and transmitting the first and the second screen information to the information processing apparatus, wherein:

the image processing apparatus has a Web server, the information terminal apparatus operates in sync with the image processing apparatus via the Web server;

the programs further cause the image processing apparatus to execute:

analyzing an access log recording accesses to the Web server when receiving a synchronous display start command; and determining that the image processing apparatus is operating in sync with the information terminal apparatus by determining that the information terminal apparatus is accessing the Web server periodically, and the image processing apparatus further comprises:

a first storage that stores identification information objects associated with screens to be displayed on the second display of the information terminal apparatus via the Web server, and the programs further cause the image processing apparatus to obtain the second screen information by creating a captured screen with reference to the identification information object associated with the second screen.

* * * * *